US012592942B2

(12) United States Patent
Sridhar et al.

(10) Patent No.: US 12,592,942 B2
(45) Date of Patent: Mar. 31, 2026

(54) SESSION ANALYSIS FOR IDENTITY THREAT DETECTION AND IDENTITY SECURITY POSTURE MANAGEMENT

(71) Applicant: WideField Security Inc., Saratoga, CA (US)

(72) Inventors: Kartik Kumar Chatnalli Deshpande Sridhar, Saratoga, CA (US); Abhay Sudhakar Kulkarni, Saratoga, CA (US); Deepak Swaminathan, Fremont, CA (US)

(73) Assignee: WideField Security Inc., Saratoga, CA (US)

( * ) Notice: Subject to any disclaimer, the term of this patent is extended or adjusted under 35 U.S.C. 154(b) by 84 days.

(21) Appl. No.: 18/887,372

(22) Filed: Sep. 17, 2024

(65) Prior Publication Data

US 2025/0106227 A1 Mar. 27, 2025

Related U.S. Application Data

(60) Provisional application No. 63/539,677, filed on Sep. 21, 2023, provisional application No. 63/539,673, filed on Sep. 21, 2023.

(51) Int. Cl.
*H04L 29/06* (2006.01)
*H04L 9/40* (2022.01)

(52) U.S. Cl.
CPC ...... *H04L 63/1416* (2013.01); *H04L 63/1441* (2013.01); *H04L 63/20* (2013.01)

(58) Field of Classification Search
CPC .. H04L 63/1416; H04L 63/1441; H04L 63/20
See application file for complete search history.

(56) References Cited

U.S. PATENT DOCUMENTS

| | | | |
|---|---|---|---|
| 2020/0128446 A1* | 4/2020 | Singh | H04L 41/145 |
| 2021/0069592 A1* | 3/2021 | Noss | A63F 13/67 |
| 2023/0231762 A1* | 7/2023 | Wang | H04L 41/064 |
| | | | 709/224 |
| 2025/0106261 A1 | 3/2025 | Sridhar et al. | |

* cited by examiner

*Primary Examiner* — Evans Desrosiers
(74) *Attorney, Agent, or Firm* — Schwegman Lundberg & Woessner, P.A.

(57) ABSTRACT

Techniques are presented for detecting and remediating security events. One method includes ingesting signals and telemetry from various tools like Software as a Service (SaaS), Endpoint Detection and Response (EDR), Mobile Device Management (MDM), and Secure Access Service Edge (SASE). Live session graphs are created for users, mapping all application token sessions. The system collects data from multiple sources to construct detailed graphs that represent user sessions, application usage, device employment, and third-party application tokens. This helps identify both legitimate and suspicious sessions, reducing false positives and enhancing effectiveness. Session graphs are analyzed to detect security threats, identify suspicious activities, and determine appropriate responses. Further, remediation tools are provided to address security events manually or automatically through established policies. The policy engine of the system distributes policies across diverse applications, enforcing them on various platforms like SaaS, identity management, and EDR applications, ensuring a comprehensive control point for security measures.

20 Claims, 20 Drawing Sheets

SESSION TOKENS ARE USER
CREDENTIALS THAT NO ONE PROTECTS

| PASSWORDS | MFA FACTORS |
|---|---|
| Password managers, secret vaults used to protect | Authenticator apps or hardware keys protect factors |

| USER KEYS | SESSION TOKENS |
|---|---|
| Keys, passkeys, etc. FIDO2 keys stored in device TPM | No real protection from theft. Tokens in cookie stores or stored on disk |

FIG. 2

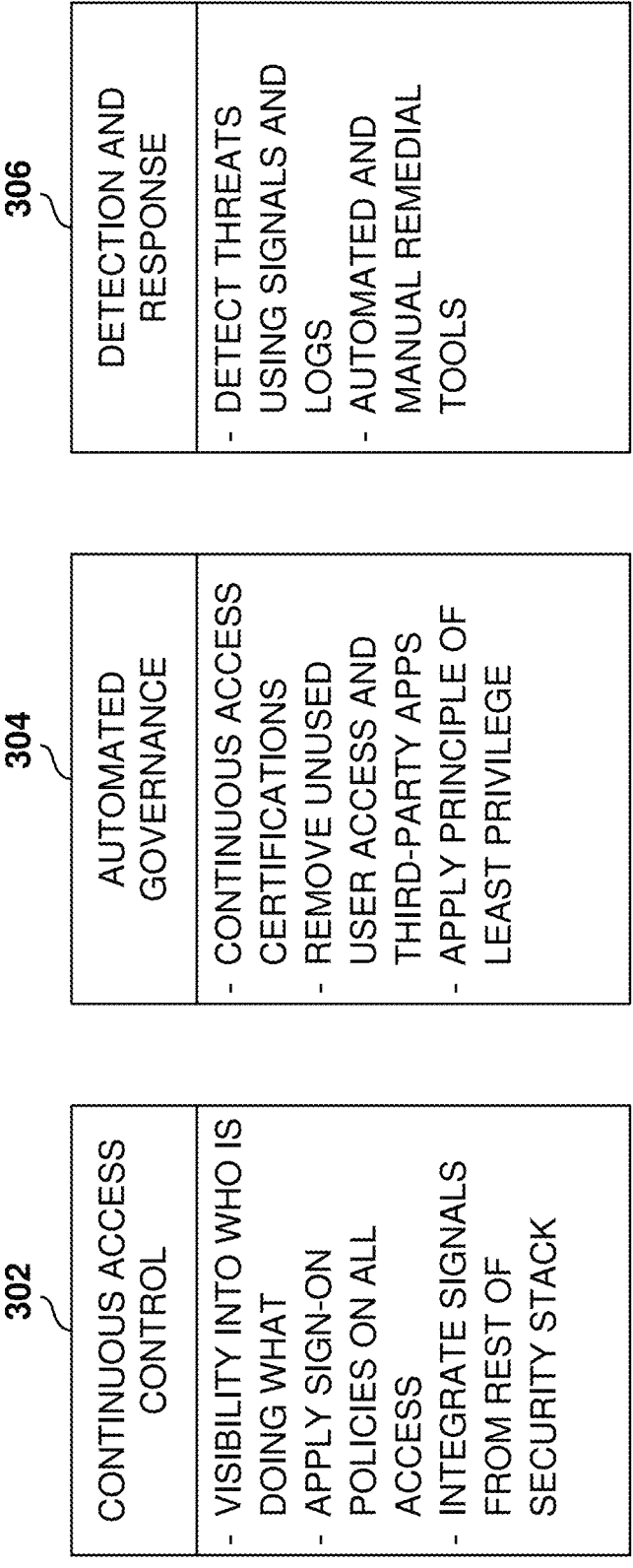

3 PILLARS OF SAAS IDENTIFY SECURITY SOLUTION

302

CONTINUOUS ACCESS CONTROL

- VISIBILITY INTO WHO IS DOING WHAT
- APPLY SIGN-ON POLICIES ON ALL ACCESS
- INTEGRATE SIGNALS FROM REST OF SECURITY STACK

304

AUTOMATED GOVERNANCE

- CONTINUOUS ACCESS CERTIFICATIONS
- REMOVE UNUSED USER ACCESS AND THIRD-PARTY APPS
- APPLY PRINCIPLE OF LEAST PRIVILEGE

306

DETECTION AND RESPONSE

- DETECT THREATS USING SIGNALS AND LOGS
- AUTOMATED AND MANUAL REMEDIAL TOOLS

INGEST SIGNALS AND TELEMETRY — 402

CREATE LIVE SESSIONS GRAPHS OF USERS — 404

ANALYZE SESSIONS GRAPHS TO DETECT SECURITY EVENTS — 406

PROVIDE REMEDIATION TOOLS FOR RESPONDING TO SECURITY EVENTS MANUALLY OR AUTOMATICALLY — 408

AN IDENTITY GRAPH FOR USERS, DEVICES, APPS, SESSIONS AND 3RD PARTY APPS

INTEGRATE EDR SIGNALS INTO A CENTRAL POLICY: REVOKE SESSIONS IF MALWARE ON ENDPOINT

1002

INVESTIGATE                                          ☒ TERMINATE ALL

🔍 SEARCH USER, APPS, ACTIVITY

USER INFO    APP SESSION

USER INFO

ⓐ JOHN DOE (JOHNDOE@WILDFIELD.IO)

◎ FEDERATED BY OKTA  ⟳ RESET PASSWORD

| MANAGER | TITLE | DEPARTMENT | LOCATION |
|---------|-------|------------|----------|
| – | – | – | FRESNO, CA, US |

FEDERATED MFA STATUS

| FEDERATED | IAM MFA ENABLED |
|-----------|------------------|
| YES | (YES) |

| MFA FACTOR SETUP | ASSURANCE LEVEL |
|------------------|------------------|
| OKTA VERIFY | (HIGH) |
| VERIFY PUSH | (MEDIUM) |
| SOFTWARE TOTP | (MEDIUM) |
| OKTA VERIFY | (HIGH) |

NON- FEDERATED MFA STATUS

| APP | STATUS | FACTOR & ASSURANCE |
|-----|--------|--------------------|
| Ⓖ GOOGLE WORKSPACE - WILDFIELD PROD | ENABLED | – |

GROUPS (SHOWING 6 OUT OF 6)

| ALL EMPLOYEES | AWS-PROD-ADMINS | ENGINEERING | EVERYONE | WIDEFIELD-OKTA-ADMINS | GOOGLE-SECOPS-ADMINS |
|---|---|---|---|---|---|

USER PRIVILEGES

| APP | ROLE |
|-----|------|
| ◎ OKTA WIDEFIELD PRODUCTION | SUPER ADMINISTRATOR |
| Ⓖ GOOGLE WORKSPACE - WIDEFIELD PROD | _SEED_ADMIN_ROLE |
| Ⓤ GITHUB | – |

USER FINDINGS ⬈

USER FINDINGS ☑

| ID | APP(S) | RISK LEVEL | CATEGORY | TIME |
|---|---|---|---|---|
| 1001 | GITHUB, GOOGLE, OKTA | MEDIUM | SEGREGATION OF DUTIES | 09/04/2024 2:34 AM PDT |

RECENT IPS

| IP ADDRESS | LOCATION | ISP | TIME |
|---|---|---|---|
| 69.185.239.230 | FRESNO, CALIFORNIA, US | COMCAST | YESTERDAY 10:14 PM PDT |
| 55.27.167.134 | SAN JOSE, CALIFORNIA, US | COMCAST | YESTERDAY 3:19 PM PDT |
| - | - | N/A | YESTERDAY 12:33 PM PDT |
| 55.27.167.134 | SANTA CLARA, CALIFORNIA, US | COMCAST | 08/27/2024 11:37 AM PDT |
| 69.185.239.230 | - | N/A | 08/19/2024 8:50 PM PDT |
| 2A09:BAC3:A466:8C:0:0:E31D | - | N/A | 08/13/2024 2:36 PM PDT |
| 136.179.21.78 | LAS VEGAS, NEVADA, US | SWITCH LTD | 08/07/2024 10:45 PM PDT |
| 172.56.209.152 | LAS VEGAS, NEVADA, US | T-MOBILE USA INC. | 08/06/2024 8:10 AM PDT |
| 138.179.21.68 | CALIFORNIA, US | SWITCH LTD | 08/06/2024 8:08 AM PDT |
| 152.39.10.100 | SAN JOSE, CALIFORNIA, US | CITY OF SAN JOSE | 08/05/2024 2:12 PM PDT |

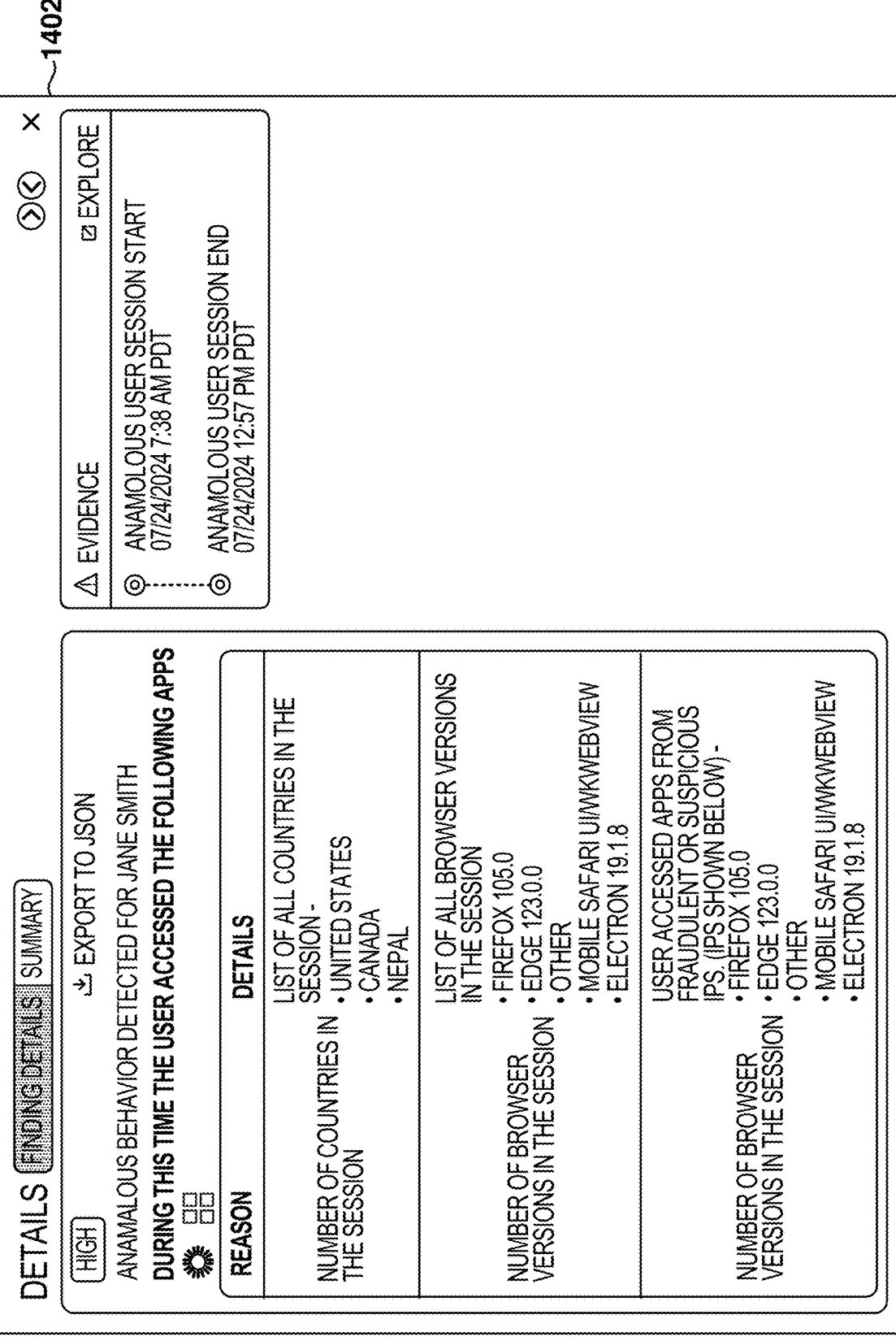

DETAILS [FINDING DETAILS] SUMMARY

⤓ EXPORT TO JSON

[HIGH]

ANAMALOUS BEHAVIOR DETECTED FOR JANE SMITH

DURING THIS TIME THE USER ACCESSED THE FOLLOWING APPS

| REASON | DETAILS |
|---|---|
| NUMBER OF COUNTRIES IN THE SESSION | LIST OF ALL COUNTRIES IN THE SESSION -<br>• UNITED STATES<br>• CANADA<br>• NEPAL |
| NUMBER OF BROWSER VERSIONS IN THE SESSION | LIST OF ALL BROWSER VERSIONS IN THE SESSION<br>• FIREFOX 105.0<br>• EDGE 123.0.0<br>• OTHER<br>• MOBILE SAFARI UI/WKWEBVIEW<br>• ELECTRON 19.1.8 |
| NUMBER OF BROWSER VERSIONS IN THE SESSION | USER ACCESSED APPS FROM FRAUDULENT OR SUSPICIOUS IPS. (IPS SHOWN BELOW) -<br>• FIREFOX 105.0<br>• EDGE 123.0.0<br>• OTHER<br>• MOBILE SAFARI UI/WKWEBVIEW<br>• ELECTRON 19.1.8 |

⚠ EVIDENCE                      ☒ EXPLORE

◎ ANAMOLOUS USER SESSION START
   07/24/2024 7:38 AM PDT
┊
◎ ANAMOLOUS USER SESSION END
   07/24/2024 12:57 PM PDT

LIVE SESSION GRAPH

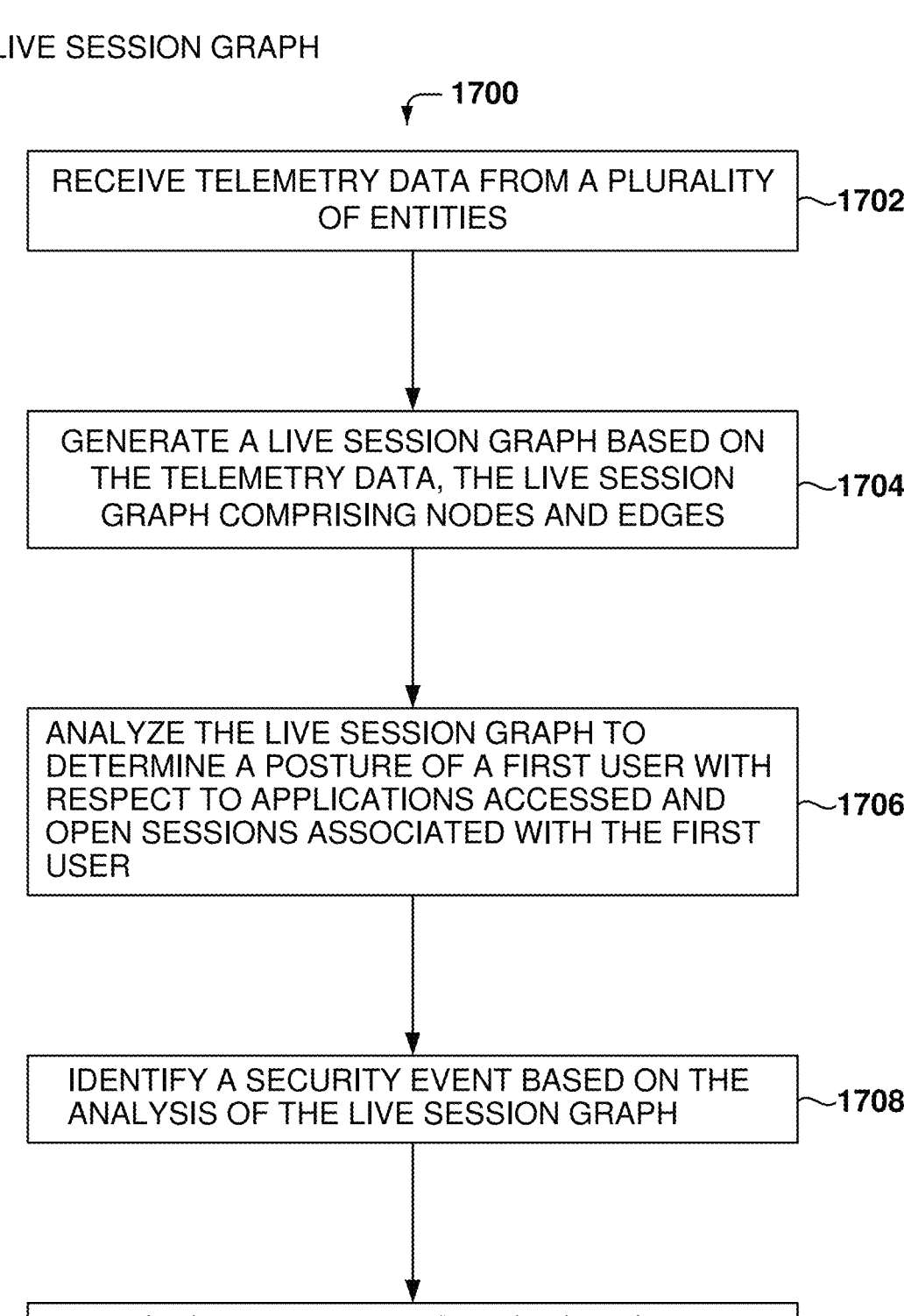

~1700

RECEIVE TELEMETRY DATA FROM A PLURALITY OF ENTITIES    ~1702

GENERATE A LIVE SESSION GRAPH BASED ON THE TELEMETRY DATA, THE LIVE SESSION GRAPH COMPRISING NODES AND EDGES    ~1704

ANALYZE THE LIVE SESSION GRAPH TO DETERMINE A POSTURE OF A FIRST USER WITH RESPECT TO APPLICATIONS ACCESSED AND OPEN SESSIONS ASSOCIATED WITH THE FIRST USER    ~1706

IDENTIFY A SECURITY EVENT BASED ON THE ANALYSIS OF THE LIVE SESSION GRAPH    ~1708

ENFORCE A REMEDIATION POLICY FOR THE IDENTIFIED SECURITY EVENT    ~1710

FIG. 17

STITCHING META SESSION ⟋— 1800

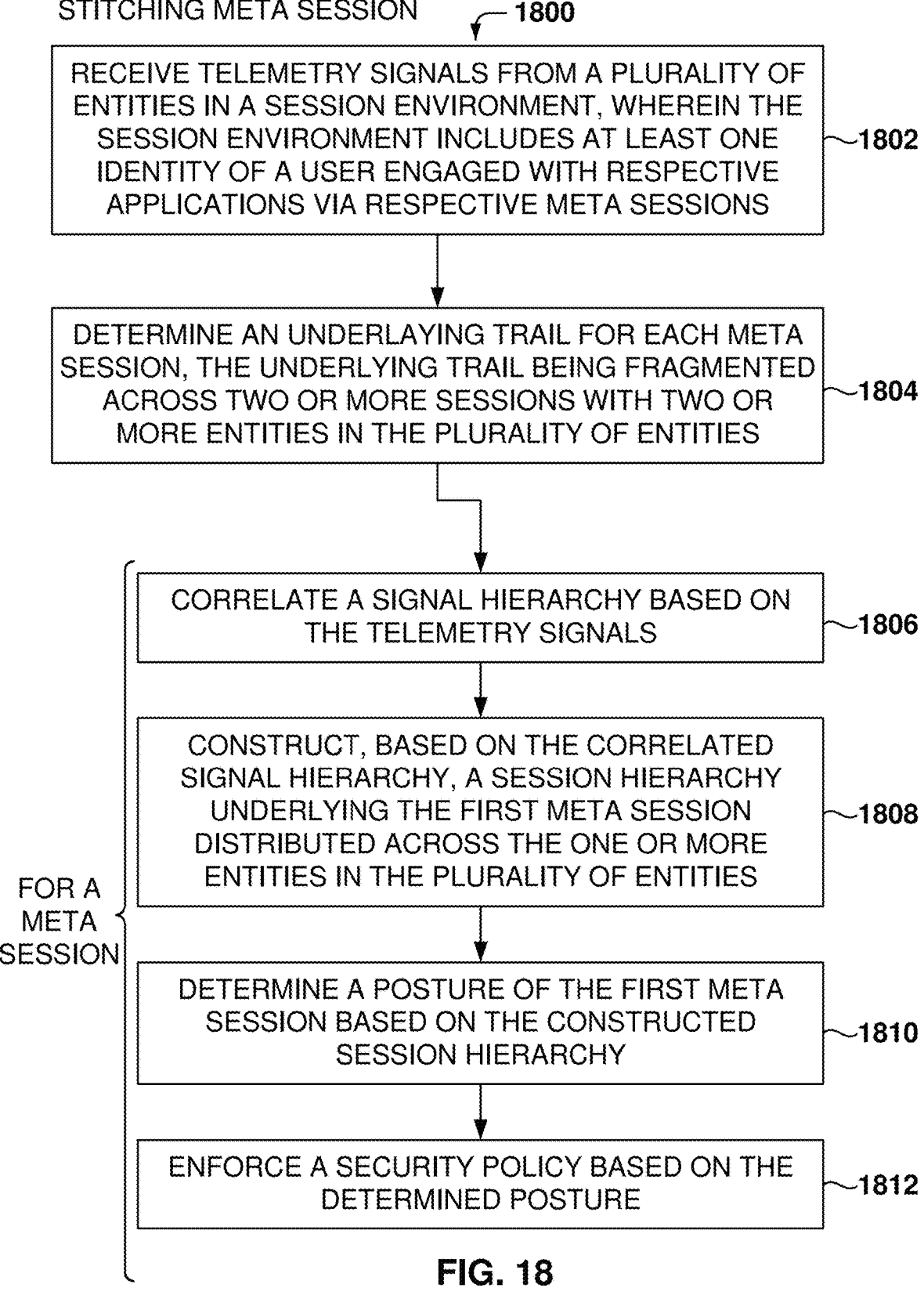

RECEIVE TELEMETRY SIGNALS FROM A PLURALITY OF ENTITIES IN A SESSION ENVIRONMENT, WHEREIN THE SESSION ENVIRONMENT INCLUDES AT LEAST ONE IDENTITY OF A USER ENGAGED WITH RESPECTIVE APPLICATIONS VIA RESPECTIVE META SESSIONS ⁓1802

DETERMINE AN UNDERLAYING TRAIL FOR EACH META SESSION, THE UNDERLYING TRAIL BEING FRAGMENTED ACROSS TWO OR MORE SESSIONS WITH TWO OR MORE ENTITIES IN THE PLURALITY OF ENTITIES ⁓1804

FOR A META SESSION

CORRELATE A SIGNAL HIERARCHY BASED ON THE TELEMETRY SIGNALS ⁓1806

CONSTRUCT, BASED ON THE CORRELATED SIGNAL HIERARCHY, A SESSION HIERARCHY UNDERLYING THE FIRST META SESSION DISTRIBUTED ACROSS THE ONE OR MORE ENTITIES IN THE PLURALITY OF ENTITIES ⁓1808

DETERMINE A POSTURE OF THE FIRST META SESSION BASED ON THE CONSTRUCTED SESSION HIERARCHY ⁓1810

ENFORCE A SECURITY POLICY BASED ON THE DETERMINED POSTURE ⁓1812

FIG. 18

INFERRING COMPROMISED IDENTITY

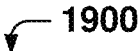 1900

```
┌─────────────────────────────────────┐
│   RECEIVE TELEMETRY SIGNALS FOR ONE OR   │
│   MORE SESSIONS ASSOCIATED WITH A USER   │──1902
│   ENGAGED WITH A PLURALITY OF APPLICATIONS │
│   THROUGH ONE OR MORE ENDPOINTS          │
└─────────────────────────────────────┘
```

```
┌─────────────────────────────────────┐
│   DETERMINE AN ACCESS PATTERN TRAIL      │
│   DISTRIBUTED ACROSS THE ONE OR MORE     │──1904
│   SESSIONS OF THE USER                   │
└─────────────────────────────────────┘
```

```
┌─────────────────────────────────────┐
│   AGGREGATE A COMPOSITE VIEW OF THE      │
│   ACCESS PATTERN TRAIL BY CORRELATING THE │──1906
│   TELEMETRY SIGNALS INTO A SIGNAL HIERARCHY │
└─────────────────────────────────────┘
```

```
┌─────────────────────────────────────┐
│   INFER A COMPROMISED IDENTITY EVENT FOR  │
│   THE USER BASED ON THE COMPOSITE VIEW OF │──1908
│   THE ACCESS PATTERN TRAIL AND THE SIGNAL │
│   HIERARCHY                              │
└─────────────────────────────────────┘
```

FIG. 19

SESSION ANALYSIS FOR IDENTITY THREAT DETECTION AND IDENTITY SECURITY POSTURE MANAGEMENT

CROSS-REFERENCE TO RELATED APPLICATIONS

This application claims the benefit of U.S. Provisional Patent No. 63/539,677, filed Sep. 21, 2023, and entitled "Systems and Methods for Aggregating a Meta Session for Identity Posture Management and Security," and U.S. Provisional Patent No. 63/539,673, filed Sep. 21, 2023, and entitled "Live Session Graph for Identity Posture Management and Security," all of which are incorporated herein by reference.

TECHNICAL FIELD

The subject matter disclosed herein generally relates to methods, systems, and machine-readable storage media for detecting and remediating security events.

BACKGROUND

Identity attacks pose a significant threat, with approximately 80% of data breaches stemming from such incidents. The abuse of valid credentials has been a persistent issue since the early days of cybersecurity, where attackers often opted to log in as legitimate users rather than hacking systems directly. The shift of enterprises to public cloud services and Software as a Service (SaaS) applications has intensified these challenges, as critical systems are now distributed globally, complicating identity management.

A significant concern arises from the prolonged application sessions that users maintain, often lasting up to 14 days or more. This extended access, governed by application sessions, increases the risk of session hijacking and third-party application token theft. Attackers have evolved from traditional password-based attacks to more sophisticated methods, allowing them to impersonate users without needing their credentials. The theft of session tokens gives unauthorized access to malicious users on various platforms.

The storage of session tokens presents a significant vulnerability, as they are frequently inadequately protected, stored in cookie stores or on disk without sufficient security measures. Detecting session hijacking attacks has proven difficult, with attackers often remaining undetected for extended periods, leading to long dwell times within enterprise environments. Traditional detection methods, reliant on single source techniques, result in high false positives and reduced effectiveness.

Current identity and access management solutions fail to adequately address these specific threats, leaving a gap in the market. The lack of focus on session hijacking and related attacks within existing platforms, including Identity Access Management, Secure Access Service Edge and Identity Governance and Administration products, exacerbates the issue. The inability to effectively detect and respond to these attacks contributes to the ongoing prevalence of data breaches despite significant investments in cybersecurity over the past two decades.

The complexity of managing user sessions in large enterprises, where thousands of users log into multiple applications daily, further complicates the detection of suspicious activities. The need for a comprehensive understanding of user behavior and session activities is critical, as existing methods do not sufficiently differentiate between legitimate and malicious activities. This lack of visibility into operational activities hampers the ability to identify and respond to potential threats effectively.

BRIEF DESCRIPTION OF THE DRAWINGS

Various appended drawings illustrate examples of the present disclosure and cannot be considered limiting its scope.

FIG. 2 illustrates the lack of protection for session tokens, according to some examples.

FIG. 3 shows the three pillars of a security solution, according to some examples.

FIG. 10 is a UI for investigating a security event, according to some examples.

FIG. 11 is a UI showing user findings, according to some examples.

FIG. 14 is a UI showing details on the findings, according to some examples.

FIG. 17 is a flowchart of a method for creating the session graph, according to some examples.

FIG. 18 is a flowchart of a method for stitching a meta session, according to some examples.

FIG. 19 is a flowchart of a method for detecting a compromised-identity event, according to some examples.

DETAILED DESCRIPTION

Figure 1:
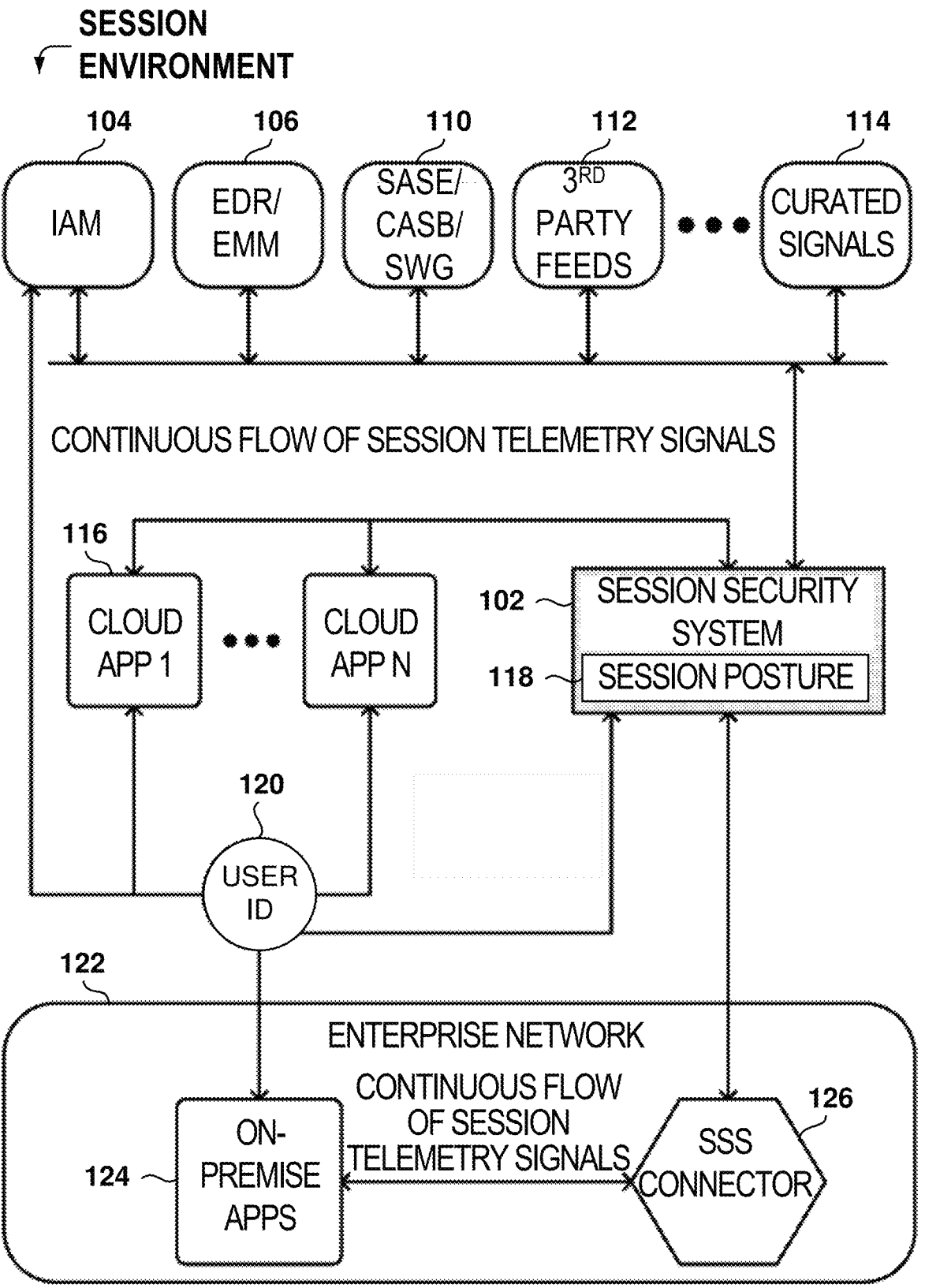
FIG. 1 illustrates an implementation of the disclosed session environment, according to some examples.

Example methods, systems, and computer programs are directed at detecting security threats in real-time and providing remediation tools to neutralize the detected security threats. Examples merely typify possible variations. Unless explicitly stated otherwise, components and functions are optional and may be combined or subdivided, and operations may vary in sequence or be combined or subdivided. The following description provides numerous specific details to provide a thorough understanding of examples.

However, it will be evident to one skilled in the art that the present subject matter may be practiced without these specific details.

Techniques are presented for detecting and remediating security events. One method includes ingesting signals and telemetry from various tools like Software as a Service (SaaS), Endpoint Detection and Response (EDR), Mobile Device Management (MDM), and Secure Access Service Edge (SASE). Live session graphs are created for users, mapping application token sessions. The system collects data from multiple sources to construct detailed graphs that represent user sessions, application usage, device employment, and third-party application tokens. This helps identify both legitimate and suspicious sessions, reducing false positives and enhancing effectiveness. Session graphs are analyzed to detect security threats, identify suspicious activities, and determine appropriate responses. Further, remediation tools are provided to address security events manually or automatically through established policies. The policy engine of the system distributes policies across diverse applications, enforcing them on various platforms like SaaS, identity management, and EDR applications, ensuring a comprehensive control point for security measures.

Glossary of Terms

Some of the concepts used for the description of the solution are presented below.

A connection is a series of related network requests and responses exchanged with an application. Thus, a series of requests and responses over the course of a day could be a single connection within an application, e.g., all use of Salesforce.com within a period without logging off.

A session, also referred to herein as an application session, is a series of related client requests during a certain time period (e.g., fifteen minutes) that are directed toward an application.

A session graph, also referred to herein as a live session graph or an identify graph, is a data structure that includes nodes, applications, endpoints, and edges. The nodes represent a user identity, the applications describe the applications that the user identity accesses, the endpoints are the access points used by the user identity to access the applications, and the edges between the nodes represent active sessions that the user identity is engaged in with the applications through the endpoints.

A session posture refers to the real-time evaluation of a user's device session during an active connection. The session posture includes information on the security of the user's device during a session and information on compliance with security policies, such as whether antivirus software is up-to-date or if certain configurations meet security standards. This session posture helps in deciding whether a session should be allowed, restricted, or terminated to maintain network security.

A user key is a unique identifier or token that is associated with a specific user within a system or application that is used to authenticate, authorize, or track the user's actions and permissions within that system.

FIG. 1 illustrates an implementation of the disclosed session environment, according to some examples. Users may access cloud applications 116 and on-premise applications 124. The cloud applications 116 are network services that can be web-based (e.g., accessed via a Uniform Resource Locator (URL)) or native, such as sync clients. Further, the cloud applications 116 can be cloud storage applications, cloud computing applications, hosted services, news websites, blogs, video streaming websites, social media websites, collaboration and messaging platforms, and customer relationship management (CRM) platforms. The cloud applications can be provided as software-as-a-service (SaaS) offerings, platform-as-a-service (PaaS) offerings, and infrastructure-as-a-service (IaaS) offerings, as well as internal enterprise applications that are exposed via URLs.

The session environment includes various components that interact to provide a continuous flow of session telemetry signals, which may be received in multiple ways, such as via Application Programming Interface (API) access.

The system comprises multiple sources of telemetry signals, including Identity and Access Management (IAM) 104, Endpoint Detection and Response/Enterprise Mobility Management (EDR/EMM) 106, Secure Access Service Edge/Cloud Access Security Broker/Secure Web Gateway (SASE/CASB/SWG) 110, third party feeds 112, curated signals 114, etc. These sources provide continuous telemetry data for monitoring and managing sessions.

The telemetry signals from these sources are fed into a Session Security System (SSS 102). Further, a series of cloud applications 116, represented as cloud app 1 through cloud app n, also provide telemetry signals to the SSS 102. The SSS 102 receives and processes the telemetry signals, ensuring that relevant session data is continuously monitored.

As used herein, the term "Session Security System" can also be referred to as "Session Identification System," "Session Monitoring System," "Session Threat Detection System," and "Session Response System."

Examples of cloud applications 116 include Box™, Dropbox™, Google Drive™, Amazon AWS™, Google Cloud Platform (GCP)™, Microsoft Azure™, Microsoft Office 365™, Google Workspace™, Workday™, Oracle on Demand™, Taleo™, Eve™, Concur™, YouTube™, Facebook™, Twitter™, Google™, Linkedin™, Wikipedia™, Yahoo™, Baidu™, Amazon™, MSN™, Pinterest™, Taobao™, Instagram™, Tumblr™, eBay™, Hotmail™, Reddit™, IMDb™, Netflix™, PayPal™, Imgur™, Snapchat™, Yammer™ Skype™, Slack™, HipChat™, Confluence™, TeamDrive™, Taskworld™, Chatter™, Gmail™, Snowflake™, Atlassian™, Gitlab™, GitHub™, Databricks, 1Password™, LastpaSS™, ServiceNow™, and Salesforce.com™.

The cloud applications 116 provide the functionality to users that is implemented in the cloud and that is the target of policies, e.g., logging in, editing documents, downloading bulk data, reading customer contact information, entering payables, deleting documents, in addition to the offerings of a simple website and e-commerce sites.

A user identity 120 component is integrated into the system, which interacts with the cloud applications, on-premise applications 124 within an enterprise network 122, and the SSS 102.

Additionally, an SSS connector 126 is a program that receives telemetry signals from the on-premise applications 124 and forwards the telemetry signals to the SSS 102.

The SSS 102 includes a session posture program 118, which processes the telemetry signals to determine the security posture of sessions. The SSS ensures that the session data is analyzed and appropriate security measures are enforced.

It is noted that some consumer-facing websites (e.g., social networks Facebook and Twitter) are some of the types of cloud applications considered here. Some cloud applications, e.g., Gmail™, can be a hybrid, with some free users using the application generally while other corporations use it as an enterprise subscription. Note that a cloud application can be supported by both web browser clients and application clients that use URL-based Application Programming Interfaces (APIs). Thus, using Dropbox™ as an example, user activity on the Dropbox™ website, as well as activity of the native application client is recorded as user activity on Dropbox™ service.

The cloud applications 116 often publish their APIs to allow communications with third parties to communicate and exchange data. An API refers to a packaged collection of code libraries, routines, protocols, methods, and fields that belong to a set of classes, including its interface types. The API defines the way that developers and programmers can use the classes for their software development just by importing the relevant classes and writing statements that instantiate the classes and call their methods and fields. An API is a source code-based application intended to be used as an interface by software components to communicate with each other. An API can include applications for routines, data structures, object classes, and variables. Basically, an API provides an interface for developers and programmers to access the underlying data, platform capabilities, and features of web services. Implementations of the technology disclosed use different types of APIs, non-exclusive examples of which include remote invocation of services to return data, web service APIs such as HTTP or HTTPs based APIs like SOAP, WSDL, Bulk, XML-RPC and JSON-RPC and REST APIs (e.g., Flickr™, Google Static Maps™ Google Geolocation™), web socket APIs, library-based APIs like JavaScript and TWAIN (e.g., Google Maps™ JavaScript API, Dropbox™ JavaScript Data store API, Twili0™ APIs, Oracle Call Interface (OCI)), class-based APIs like Java API and Android API (e.g., Google Maps™ Android API, MSDN Class Library for NET Framework, Twili0™ APIs for Java and C #), OS functions and routines like access to file system and access to user interface, object remoting APIs like CORBA and .NET Remoting, and hardware APIs like video acceleration, hard disk drives, and PCI buses. Other examples of APIs used by the technology disclosed include Amazon EC2 API™ Box Content API™ Box Events API™ Microsoft Graph™ Dropbox API™ Dropbox API V2™ Dropbox Core API™ Dropbox Core API v2™, Facebook Graph API™ Foursquare API™ Geonames API™ Force.com API™, Force.com, Metadata API™ Apex API™ Visualforce API™ Force.com Enterprise WSDL™, Salesforce.com Streaming API™, Salesforce.com Tooling API™ Google Drive API™, Drive REST API™, AccuWeather API™, and aggregated-single API like CloudRail™ API.

A sequence of events may occur in the context of a session. Some events include: (a) login to provide user credentials to an application to authenticate the user; (b) application transactions to execute application-related operations (e.g., upload documents, download documents, add leads, define new campaigns); and (c) log-out to terminate the application session with an application server of the application. In some examples, the session is identified by a session cookie in the HTTP header, and an application session identifier is assigned. The session cookie or a URL parameter can be used to define the session.

In some examples, a connection may be associated with an application session identifier, e.g., a cookie or a URL parameter, used by the application so that each connection corresponds to a unique session identifier. A connection can include a sequence of application sessions within the boundaries of a login event and a log-out event, such that application sessions in the sequence of application sessions are partitioned by time-out events.

FIG. 2 illustrates the lack of protection for session tokens, according to some examples. There are several ways to authenticate users online, including the use of passwords, Multi-Factor Authentication (MFA) factors, user keys, and session tokens.

Users typically employ password managers for password storage and utilize MFA applications, such as one-time password (OTP) generators or hardware security keys. Some user keys are securely stored within a Trusted Platform Module (TPM) on devices such as laptops or smartphones. However, session tokens lack adequate protection against theft. These tokens are often stored in cookie stores or on disk without sufficient security measures, representing a significant vulnerability in user authentication systems.

Password managers and secret vaults are some of the ways to protect passwords. Further, authenticator apps or hardware keys may be used to protect multi-factor authentication (MFA) factors. User keys may be protected using passkeys or FIDO2 keys stored in a device Trusted Platform Module (TPM). A FIDO2 key is part of the FIDO2 (Fast Identity Online 2) standard, which provides a secure and passwordless authentication method for users. FIDO2 combines the Web Authentication (WebAuthn) API and the Client to Authenticator Protocol (CTAP) to create robust cryptographic login methods that eliminate the need for passwords. Instead, it uses public key cryptography to authenticate users.

Existing identity and access management platforms, including prominent providers, have not focused on this issue with the same intensity. Additionally, Secure Access Service Edge (SASE) platforms and Identity Governance and Administration (IGA) products are similarly neglecting this area. Identity Theft Detection and Response (IDR) mechanisms are also lacking in this regard.

Detection of session hijacking attacks is important for cyber security, as it facilitates the identification of various initial access attacks. The cybersecurity sector has witnessed substantial investment over the past two decades, amounting to billions of dollars; however, data breaches remain prevalent. A prevailing theory suggests that addressing initial access attacks can significantly enhance overall security, thereby reducing the frequency of data breaches and related issues.

The detection of session hijacking attacks is instrumental in identifying a range of initial access attacks, which include application token abuse, man-in-the-middle attacks, and password theft. These attacks ultimately result in compromised sessions. Attackers typically engage in reconnaissance activities to gather information such as email addresses, IP addresses, and exposed servers, which they utilize to gain initial access to organizational infrastructure.

Many organizations utilize single sign-on (SSO) solutions to streamline user authentication across multiple applications and devices. These SSO solutions often employ SAML 2.0 (Security Assertion Markup Language), which facilitates secure communication of authentication data. This implementation allows for the integration of multi-factor authentication, enhancing security at the time of user login. However, a significant issue arises after the initial login, as users tend to remain logged into applications for extended periods, e.g., up to 14 days or longer. This prolonged access is governed by the application session, which defines the duration of user authentication.

Research indicates that the length of application sessions increased during the COVID-19 pandemic as remote work became more prevalent. Consequently, enterprises now manage a substantial number of long-running application sessions. Additionally, there has been a rise in application-to-application connections, where established applications, such as communication and productivity tools, integrate with one another. While well-known applications typically maintain secure connections, numerous smaller applications exist that may be vulnerable to misuse or unauthorized access within enterprise environments.

Many attackers have transitioned from traditional password-based attacks, which involve attempting to steal user passwords to gain unauthorized access, to more sophisticated methods, such as session hijacking and third-party application token theft.

In this context, session hijacking allows an attacker to take over a user's active session without needing to obtain the user's password or multi-factor authentication codes. This method has become increasingly prevalent, as it enables attackers to impersonate users without their knowledge. Additionally, the theft of tokens associated with third-party applications has emerged as a significant threat. Session hijacking has gained traction among a broader range of attackers, including not only nation-state actors but also large corporations.

Victims have fallen prey to the theft of session tokens, which are subsequently sold on dark web marketplaces. An individual can utilize these stolen sessions to log in as another user from a different location. The process is relatively straightforward, and there are minimal protections in place against such actions. This vulnerability has been exploited to gain unauthorized access to several online collaboration platforms.

Detecting session hijacking attacks is challenging, as existing research indicates that attackers often remain undetected within an enterprise for extended periods. This duration, referred to as dwell time, ideally should be measured in hours; however, many organizations, including large enterprises, have reported dwell times extending to weeks. Notable examples include incidents involving major corporations, where detection of breaches took more than 14 days.

Traditional methods for detecting session hijacking have relied on single-source detection techniques, which typically involve applying rules to individual log files. This approach is inherently limited, resulting in either a high volume of false positives or a reduction in detection effectiveness. Consequently, the overall efficacy of these methods is low.

In contrast, by aggregating signals from multiple sources, a comprehensive analysis of the attack can be conducted. This holistic approach allows for more accurate detection of session hijacking incidents, overcoming the limitations associated with single-source detection methods.

FIG. 3 shows the three pillars of a SaaS security solution, according to some examples.

Continuous access control 302 includes visibility into user activities, application of sign-on policies for all access, and integration of signals from the rest of the security stack. Further, automated governance 304 encompasses continuous access certifications, removal of unused user access and third-party applications, and application of the principle of least privilege. Detection and response 306 involves detecting threats using signals and logs and employing both automated and manual remedial tools.

The session graph serves as a powerful tool to detect identity compromise, enabling timely responses and future prevention measures. The session graph evaluates identity posture and facilitates continuous drift detection.

Identity posture is also valuable for protection against cyber attacks as organizations often establish policies over time, which may lead to the creation of exceptions. These exceptions can result in policy drift over months or years, creating significant vulnerabilities due to outdated policies.

Further, threat detection utilizes session data, which provides insights into enterprise activities. For instance, the deployment of multi-factor authentication may reveal that numerous users are not utilizing this security measure, indicating a policy loophole. This analysis allows organizations to identify such discrepancies, with the session graph being an effective tool for this detection.

Further, nonhuman identities are analyzed by the SSS 102 to identify access, e.g., application-to-application access, that may not be tracked in other ways. Additionally, privileged access management is analyzed to identify users who may have improper privileged access.

Figure 4:
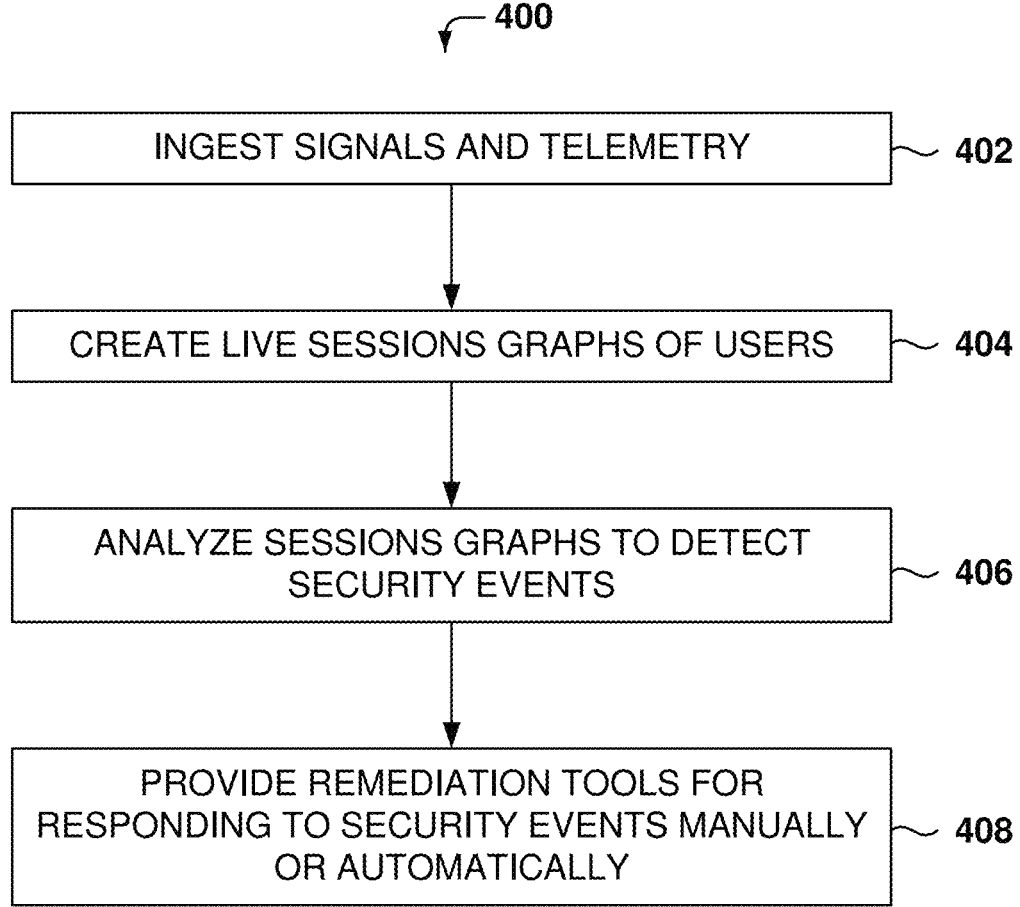
FIG. 4 is a flowchart of a method for detecting and remediating security events, according to some examples.

FIG. 4 is a flowchart of a method 400 for detecting and remediating security events, according to some examples. Operation 402 is for ingesting signals and telemetry by the SSS 102.

From operation 402, the method 400 flows to operation 404 for creating live session graphs for the users in the system and mapping application token sessions. The SS ingests signals and telemetry from various tools, including Software as a Service (SaaS), Endpoint Detection and Response (EDR), Mobile Device Management (MDM), and Secure Access Service Edge (SASE). SASE functions similarly to traditional proxy services and Secure Web Gateways.

A session graph is created to represent user sessions within an enterprise. This graph maps the token sessions of users and applications. Users will onboard the system by connecting to various data sources. Data will be extracted from Software as a Service (SaaS) applications, public cloud applications, Endpoint Detection and Response (EDR) data, Secure Access Service Edge (SASE) and Enterprise Mobility Management (EMM which is similar to Mobile Device Management—MDM) data.

The collected data is utilized to construct a detailed graph that encompasses users, the applications they utilize, their session activities, the devices they employ, and third-party application tokens that have been granted access. This graph serves multiple purposes, including the identification of legitimate sessions.

While the detection of malicious activities is essential, the identification of legitimate activities is equally important, as it constitutes approximately 99.9% of all activities. By distinguishing legitimate sessions, the system effectively reduces the number of false positives, enhancing overall effectiveness.

In some examples, the legitimate sessions are filtered out, and the remaining activities are categorized as suspicious sessions. Various rules, analytics, and machine-learning techniques may be employed to detect these suspicious sessions.

From operation 404, the method 400 flows to operation 406 to analyze the session graphs in order to detect security events, such as threats to attack the enterprise systems. Detection and mapping of security threats involves two components: identifying suspicious activities and determining appropriate responses.

From operation 406, the method 400 flows to operation 408 to provide remediation tools for responding to security events, manually or automatically, without user intervention. SSS provides options to create policies that address specific vulnerabilities that attackers may exploit. This proactive approach allows for the implementation of automated responses to detected threats, reducing the need for manual intervention. Policies can range from basic, common-sense measures to more complex, sophisticated strategies.

For example, SS may provide single-click manual remediation to trigger security measures and automatically perform the security measures based on established policies.

The policy engine has a distributed nature. Unlike traditional cybersecurity devices such as Intrusion Detection Systems (IDS), Intrusion Prevention Systems (IPS), or firewalls, which typically apply policies to a singular aspect of network traffic (e.g., allowing or denying specific network traffic), the SSS applies policies across a diverse range of applications. For example, policies are enforced on Software as a Service (SaaS) applications, identity management applications, and Endpoint Detection and Response (EDR) applications, establishing a distributed control point for the implementation of common-sense policies across various platforms.

Figure 5:
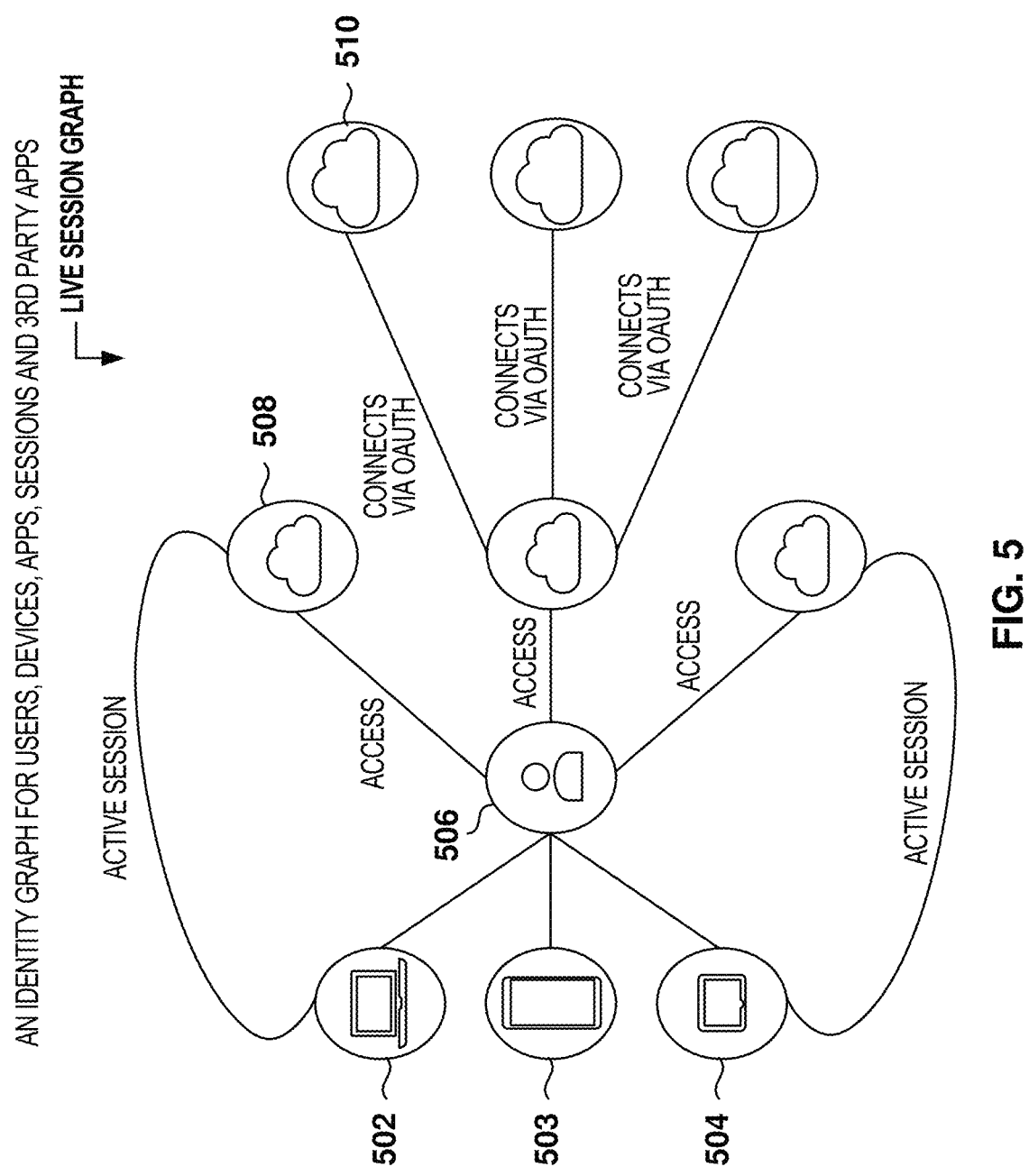
FIG. 5 illustrates one implementation of the disclosed live session graph, according to some examples.

FIG. 5 illustrates one implementation of the disclosed live session graph, according to some examples. The session graph represents an identity graph for users, devices, apps, sessions, and third-party apps.

A user 506 may use several devices (e.g., laptop 502, smartphone 503, tablet 504) to access different services and applications, such as cloud-based applications 508 and 510. The access may be direct or via third-party cloud providers using OAuth (Open Authorization), which is an open standard protocol that allows secure, token-based access to cloud services without needing to share or expose a user's credentials (like usernames and passwords). It enables third-party applications or services to access a user's data on cloud platforms (such as Google, Microsoft, or Amazon) without giving them full control or access to the user's account.

The user 506 may have active sessions in multiple cloud services. These active sessions illustrate the ongoing interactions between the user and the connected entities.

The live session graph correlates and analyzes data to build a comprehensive representation of the user and application sessions. The complexity of this task is significant, particularly in large enterprises, where each user logs into around ten applications daily. For an enterprise with 40,000 users, this results in an estimated 1.5 million sessions or more each day, with each session being long-lived and accumulating over time.

Tracking these sessions requires a retrospective analysis of user activity, necessitating the examination of data from several days (e.g., 7, 14, 21, or even 30 days) prior to effectively mapping activities to specific sessions.

Additionally, the system facilitates ad-hoc investigations, enabling users to ascertain the activities of individuals, determine whether any behavior appears suspicious, and conduct further analysis as needed.

Figure 6:
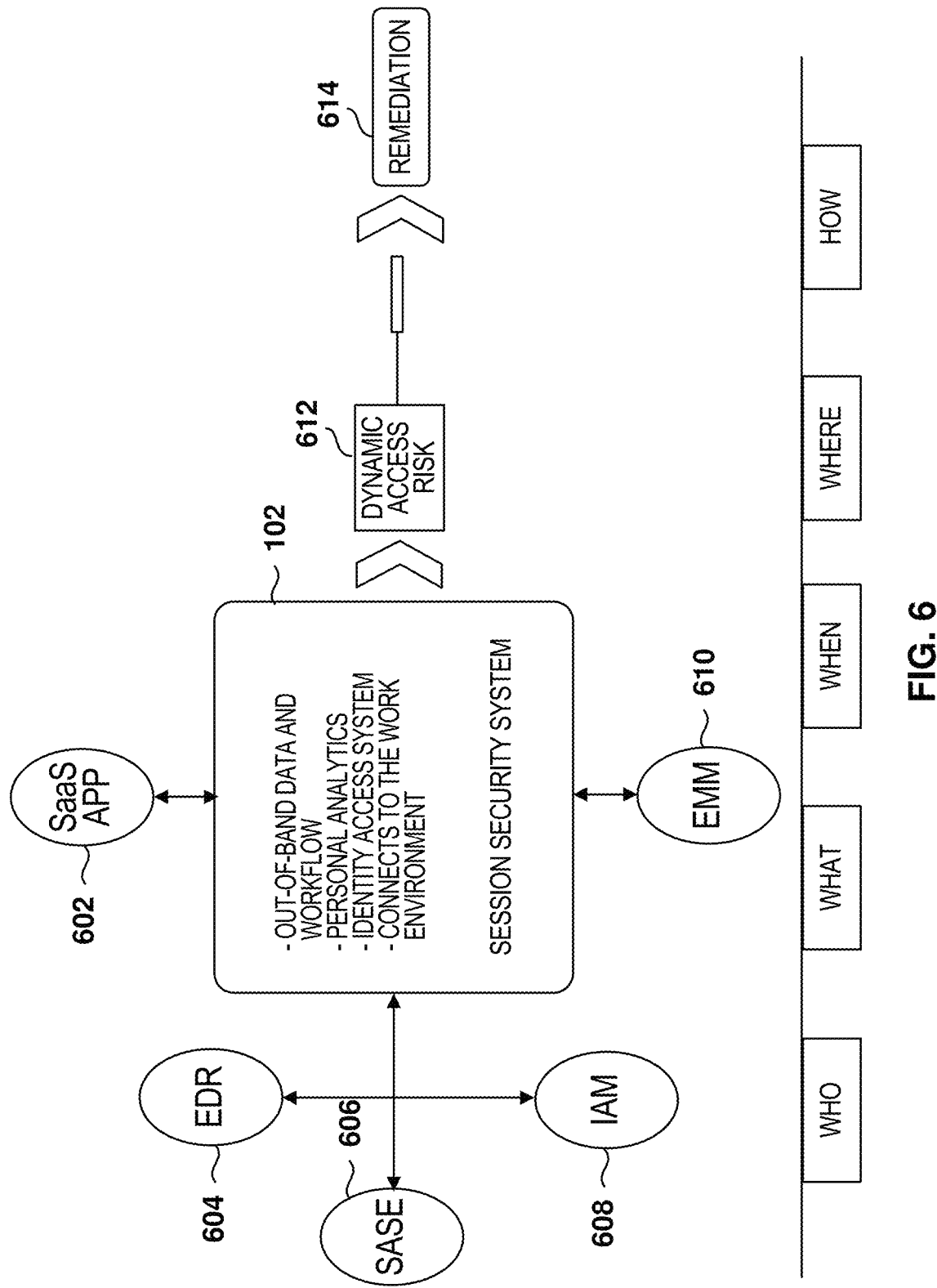
FIG. 6 illustrates the Session Security System (SSS) solution according to some examples.

FIG. 6 illustrates the solution according to some examples. The SaaS App 602 receives information from several elements to generate a dynamic access risk 612, which is the risk associated with security events. If a security event with a risk above a predetermined threshold is detected, the remediation 614 component is configured for taking corrective actions based on the risk assessments and security policies enforced by the SSS 102.

The SSS 102 connects to SaaS app 602, EDR 604, SASE 606, IAM 608, and EMM 610 to receive telemetry data, which is used to monitor and respond to endpoint threats. The SaaS App 602 provides telemetry data on cloud applications implemented as software-as-a-service.

The EDR 604 is configured to detect, investigate, and respond to threats on endpoints (e.g., laptops, desktops, servers, and mobile devices) by combining real-time continuous monitoring and data collection with automated responses to mitigate and prevent security incidents.

The SASE 606 is a cloud-based security framework that combines wide-area networking capabilities with comprehensive security functions to deliver both networking and security services directly from the cloud to provide secure and efficient access to applications and resources. The IAM 608 ensures proper identity verification and access control.

The EMM 610 is a set of technologies, processes, and policies configured to manage and secure mobile devices, applications, and data used within an organization. EMM helps ensure that mobile devices, such as smartphones and tablets, comply with corporate security standards, protecting sensitive business information while allowing employees to work from anywhere.

The 612 is configured to determine, for each security event, the who, what, when, where, and how for the security event in order to expedite the quick resolution of security events and neutralization of malicious attacks.

Figure 7:
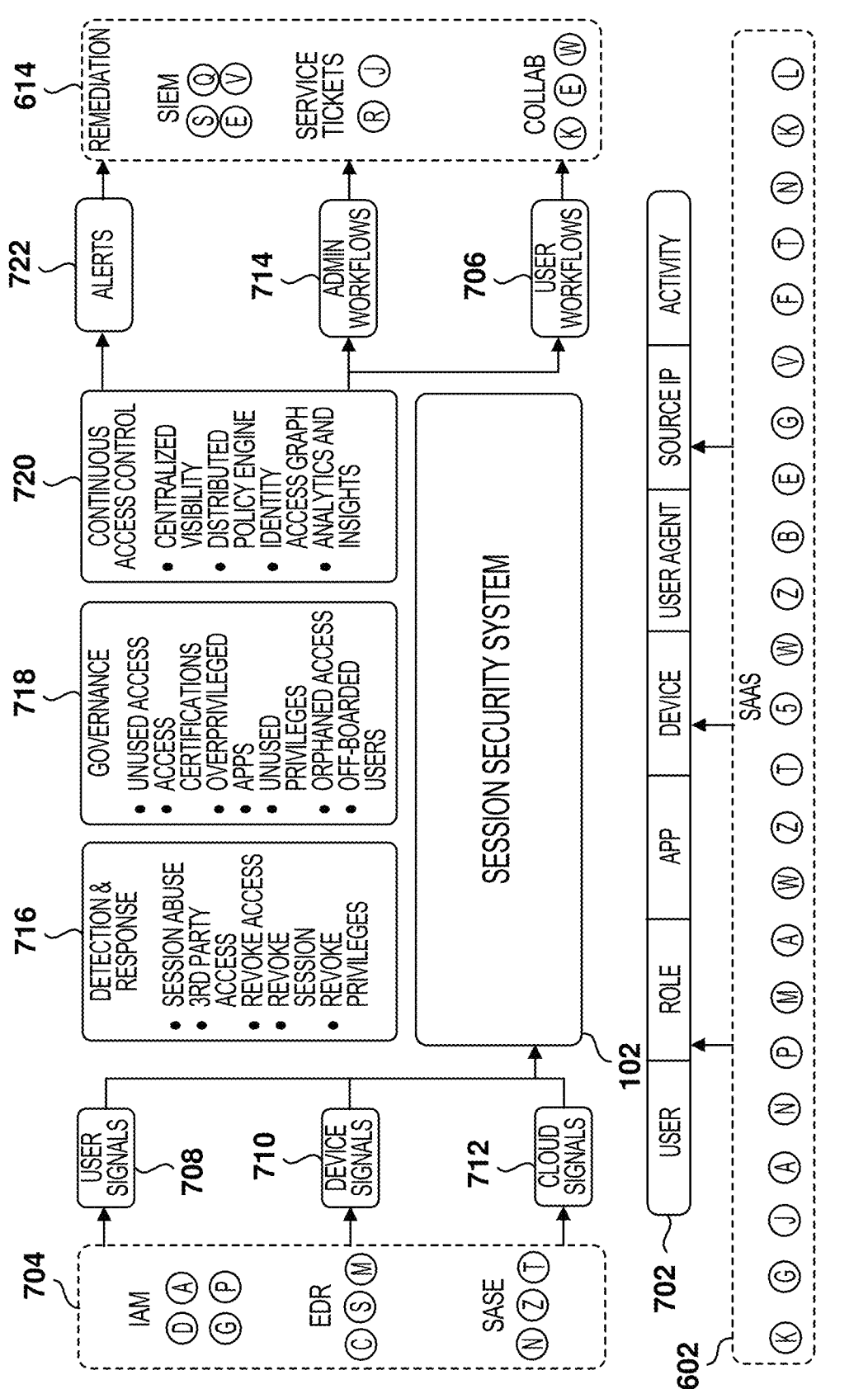
FIG. 7 is a detailed architectural diagram showing the components of the SSS solution, according to some examples.

FIG. 7 is a detailed architectural diagram showing the components of the SSS solution, according to some examples. The system integrates various signals and workflows to ensure comprehensive session security across different platforms and services.

The SSS 102 interfaces with multiple components to manage and secure user sessions. The SaaS App 602 includes various SaaS applications that generate data 702, including user, role, app, device, user agent, source IP, and activity data.

The telemetry sources 704 include IAM, EDR, and SASE, which provide user signals 708, device signals 710, and cloud signals 712 to the SSS 102. These signals are utilized to construct a live graph, which serves as the foundation for analytics and insights.

The SSS 102 provides several features, including detection and response 716, governance 718, and continuous access control 720. Analytics and insights generated from the live graph are essential for enterprises, particularly those of significant size, as they often lack visibility into operational activities. The insights provided are important for understanding enterprise dynamics.

Detection and response 716 is responsible for detecting session abuse, detecting third-party access, and then revoking access, sessions, and privileges as necessary.

Further, governance 718 is for managing privileged governance and manages unused access, access certifications, overprivileged apps, unused privileges, orphaned access, and off-boarded users. Governance 718 identifies users who do not connect to specific applications despite having access. For instance, if a user has never interacted with a particular application, the access can be terminated as it is deemed unnecessary.

Additionally, user signals 708 detects over-privileged applications, unused privileges, and orphaned access. Orphaned access refers to permissions granted to users who continue to utilize them, even when the original grantor is no longer employed by the organization. The system also identifies off-boarded users who retain access to company data.

The continuous access control 720 provides centralized visibility, a distributed policy engine, an identity access graph, and analytics and insights for continuous access control. Continuous access control is achieved by providing centralized visibility and utilizing a distributed policy engine. This approach allows for the ongoing verification of user credentials throughout long-lived application sessions rather than limiting checks to the initial login point. The implementation of a graph structure enhances this process. When continuous access control is in effect, a series of alerts 722 and detections are generated. These alerts are forwarded to a Security Information and Event Management (SIEM) system, resulting in the creation of service tickets for work-flow management. Additionally, user workflows may incorporate bots (e.g., a Slack bot, a Microsoft Teams bot) to notify end users of relevant alerts.

When security events are detected, alerts 722 are generated, and the remediation 614 component is invoked to address the security event. Further, the SSS 102 provides administration workflows 714 and user workflows 706, which also feed into the remediation 614 to define how security events are remediated.

Remediation 614 includes the SIEM service, service tickets to manage and track security incidents and responses, and collaboration tools to facilitate communication and coordination among users and administrators.

Two distinguishing features of this graph structure are noteworthy. First, the hierarchical nature of the graph is significant. This hierarchy allows for the effective aggregation of signals and telemetry data into a data lake, facilitating meaningful analysis that would not be achievable through conventional methods.

Second, an implicit hierarchy exists in the generation of these signals, which influences user progression as individuals interact with applications. An in-built state machine is employed to monitor these hierarchical signals at scale, providing visibility across the enterprise. This capability represents an innovation in the approach to continuous access control and user credential management.

Figure 8:
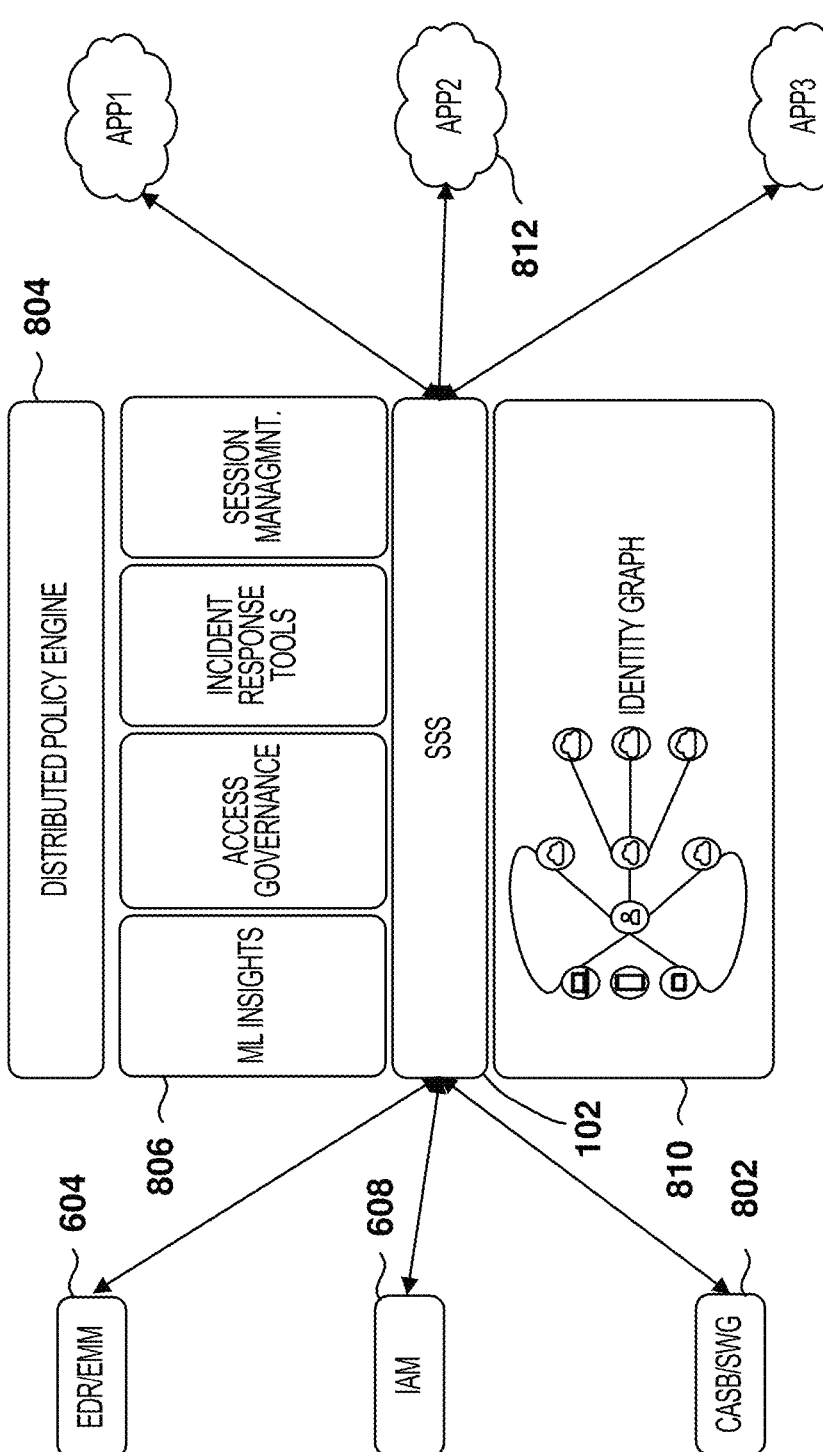
FIG. 8 illustrates the process for integrating Endpoint Detection and Response (EDR) signals into a central policy, according to some examples.

FIG. 8 illustrates the process for integrating EDR signals into a central policy, according to some examples. The system illustrated in FIG. 8 illustrates the process for integrating EDR signals into a central policy, where sessions are revoked if malware is detected in an endpoint.

The EDR/EMM module 604 collects endpoint detection and response signals. These signals are then transmitted to the SSS 102. The SSS 102 further collects information from the IAM 608 and a CASB/SWG 802 module, representing Cloud Access Security Broker/Secure Web Gateway.

The SSS 102 creates the identity graph 810 that maps relationships between different entities within the system. The SSS 102 includes a distributed policy engine 804, which is responsible for managing and enforcing security policies across the system.

Further, the SSS 102 various tools 806, including machine learning (ML) insights, access governance, incident response tools, and session management. Further, the SSS 102 gathers telemetry data from several various applications 812.

Figure 9:
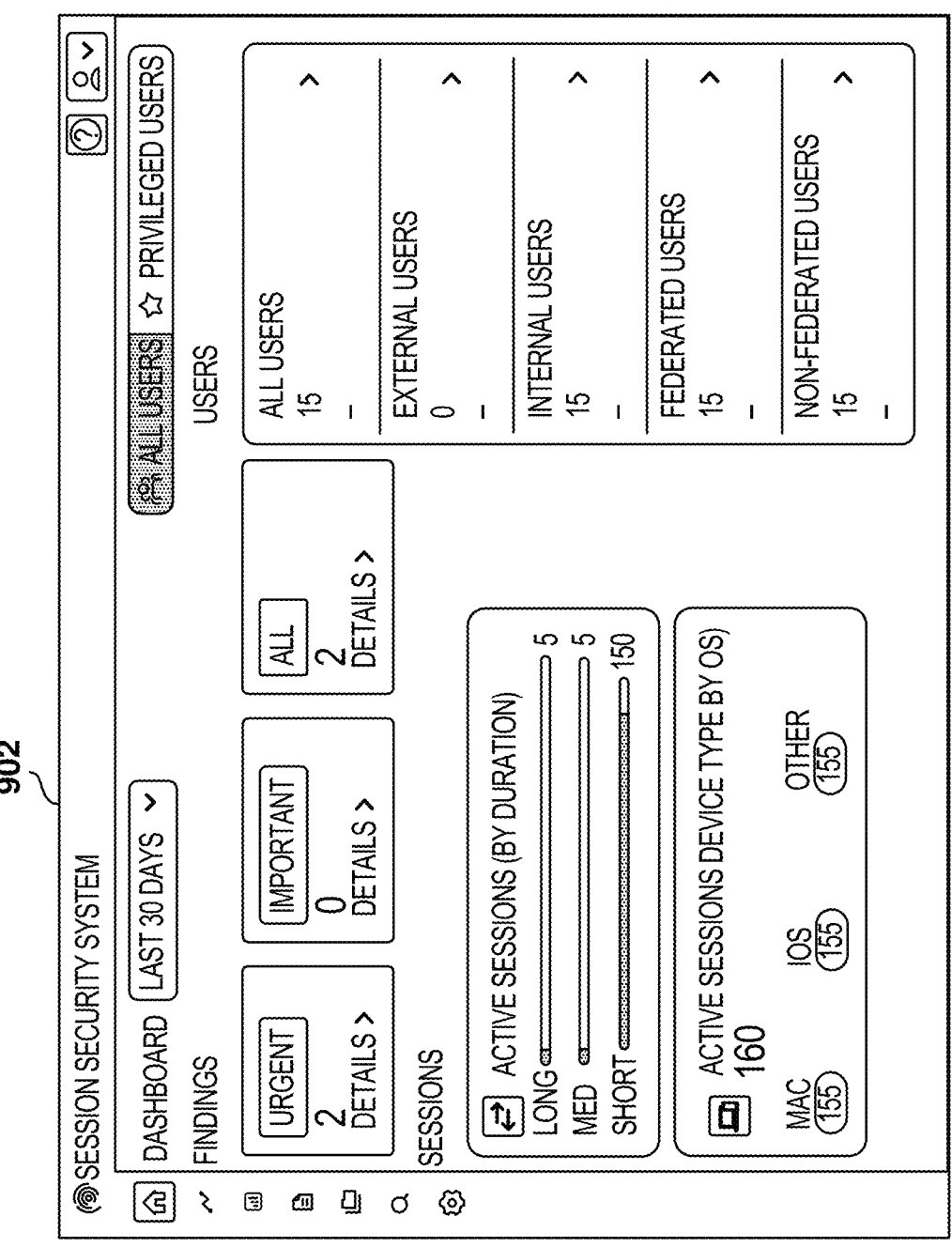
FIG. 9 is a user interface (UI) for a user dashboard, according to some examples.

FIG. 9 is a user interface (UI) for a user dashboard, according to some examples. The UI 902 is designed to provide a comprehensive overview of various metrics and user information. The top of the UI 902 includes the title "Dashboard," a user profile icon on the right side, and a dropdown menu for selecting the time range (e.g., "last 30 days").

A menu on the left side of the UI 902 includes icons for selecting analytics, policies, reports, investigate, and settings. The illustrated example is for the UI presented when the user selects the investigate option. The focus is on obtaining information regarding individual performance. In the event of an alert concerning an individual, the details of the security event are presented for review.

A Findings section displays three categories of findings: urgent, important, and all. The urgent section displays the number of urgent findings (e.g., 2) with a "Details" link for more information. Further, the important section displays the number of important findings (e.g., 0) with a "Details" link for more information. The all section displays the total number of findings (e.g., 2) with a "Details" link for more information.

A Sessions section is located below the Findings section. It provides information about active sessions, including the active sessions by duration and the active sessions by device type and Operating System (OS).

The active sessions by duration presents the total number of active sessions (160) categorized by duration (e.g., long, medium, and short) with corresponding bar graphs.

The active sessions by device type and OS displays the total number of active sessions (e.g., 160) categorized by device type and OS (e.g., Mac, iOS, Other) with corresponding icons and counts.

A Users section is located on the right side of the UI 902. It provides detailed user information, including All users (displays the total number of users and a link for more details), External users (displays the number of external users with a link for more details, Internal users (displays the number of internal users with a link for more details), Federated users (displays the number of federated users with a link for more details, and Non-federated users (displays the number of non-federated users with a link for more details).

FIG. 10 is a UI 1002 for investigating a security event, according to some examples. The UI 1002 includes various elements such as information fields, options, buttons, and other relevant components to facilitate the investigation process.

A search bar is located at the top of UI 1002, which allows users to search for specific users, apps, or activities. Below the search bar, there are two tabs labeled "User Info" and "App Session." The "User Info" tab is currently active, displaying detailed information about the user.

The user information section provides details about the user, including user name (the name of the user under investigation), federated ID, manager (the name of the user's manager), title (the user's job title), department (the department of the user), and location (the geographical location of the user).

A Federated MFA Status section displays the status of the user's MFA and includes an option to indicate if the user is federated and if the IAM MFA is enabled. Federated identity refers to the ability to use a single set of credentials (such as a username and password) to access multiple applications or systems across different organizations or domains. It allows for seamless authentication and access control without needing to maintain separate credentials for each service. Non-federated identities refer to accounts that exist outside of a single sign-on (SSO) provider. The use of multi-factor authentication (MFA) is important for securing these accounts.

Non-federated accounts allow access to SaaS applications without routing through the SSO provider, which presents a significant security threat vector. It is important to identify the roles held within various applications, particularly in contexts where privileged access is granted, such as in GitHub and Google.

The Federated MFA Status section further includes a table for MFA Factor Setup and Assurance Level, which lists the different MFA factors set up for the user along with their respective assurance levels (e.g., High, Medium, or Low). In the illustrated example, the MFA factors include "Okta Verify," "Verify Push," "Software TOTP," and "Okta Verify."

A Non-Federated MFA status section provides information about the non-federated MFA status, which includes a table for the non-federated apps with columns for the application, the status (MFA enabled or disabled), and the Factor & Assurance level associated with the MFA.

A Groups section lists the groups to which the user belongs. It shows a subset of groups with an option to view all groups. The groups listed include "All Employees," "AWS-prod-admins," "Engineering," "Everyone," "Wide-field-okta-admins," and "google-secops-admins."

A User Privileges section details the user's privileges across different applications in the form of a table with columns for application and role. The illustrated examples include entries for "Okta WideField Production" with a role of "Super Administrator," a "Google Workspace—Wide-Field Prod" with a role of "_SEED_ADMIN_ROLE," and a Github entry without a role assigned.

A Terminate All Button located at the top right corner of the UI 1002 button allows the user to terminate all active sessions for the user under investigation.

FIG. 11 is a UI 1102 showing user findings, according to some examples. The UI 1102 provides an overview of the findings related to a specific user. The UI 1102 is designed to provide a comprehensive view of user findings, including detailed information about associated applications, risk levels, categories, and recent IP addresses, along with their respective locations, ISPs, and timestamps.

The UI 1102 includes fields associated with the user findings, including an ID field (e.g., 1001), applications field (e.g., Github, Google, Okta), risk level field (e.g., High, Medium, Low), a category field that categorizes the type of finding (e.g., Segregation of Duties), and a date-and-time field showing when the finding was recorded (e.g., 09/04/2024 2:34 AM PDT).

A table is included below for Recent IP addresses, which provides a list of recent IP addresses associated with the user finding. The table has an entry for each IP address. It includes the following columns: IP address (e.g., 69.181.219.230, 50.217.167.134), a location Field showing the geographical location associated with each IP address (e.g., Saratoga, California, US, San Jose, California, US), an ISP field indicating the Internet Service Provider for each IP address (e.g., Comcast, "Switch Ltd), and a date-and-time field showing the date and time when each IP address was recorded (e.g., Yesterday 10:14 PM PDT, "08/19/2024 6:50 PM PDT).

Figure 12:
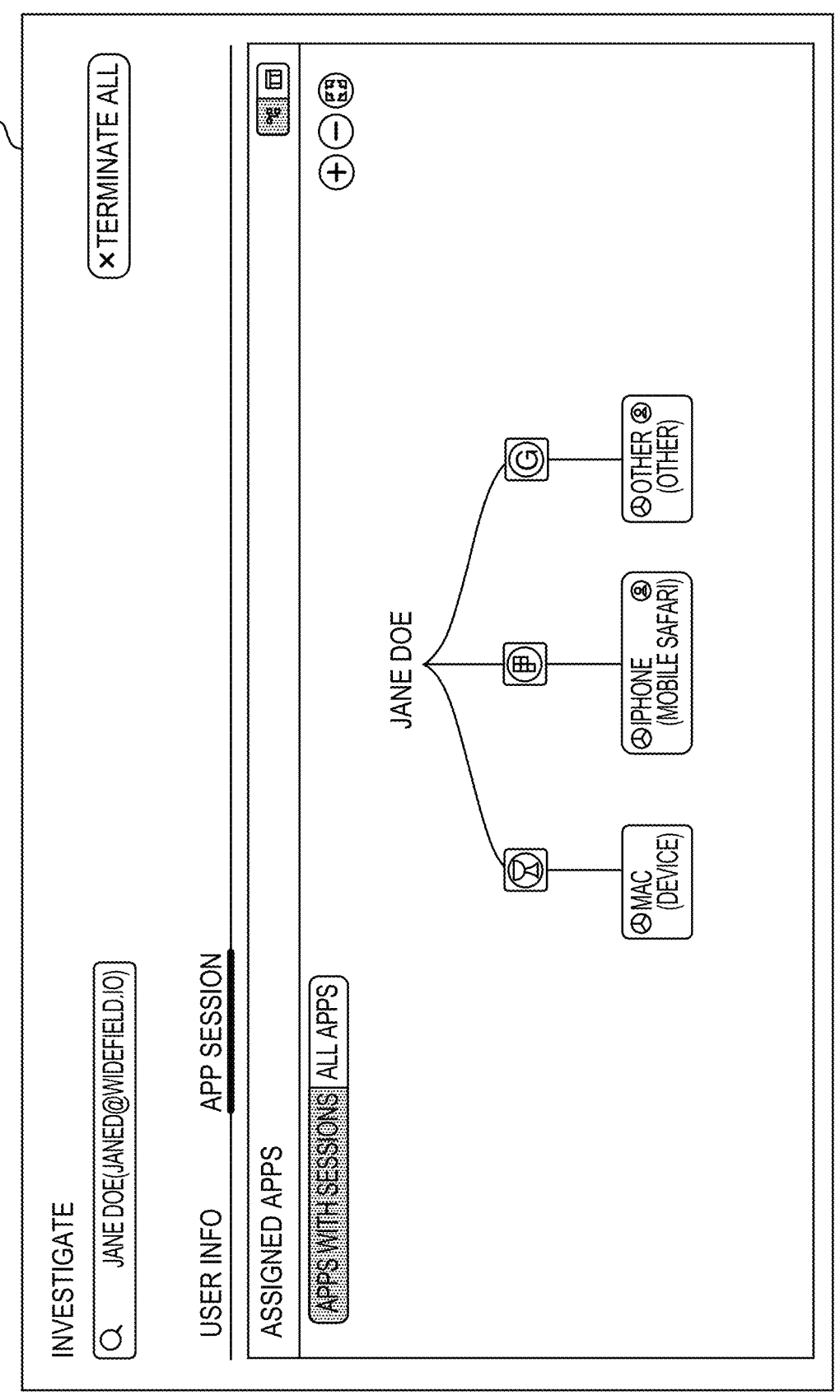
FIG. 12 is a UI showing the user graph, according to some examples.

FIG. 12 is a UI 1202 showing the user graph, according to some examples. The UI 1202 is designed to provide a graphical representation of user interactions with various applications.

A search field is provided to perform searches for the investigation. In the illustrated example, the name of the user has been entered.

Below the search bar, there are two tabs labeled "User Info" and "App Session." The "App Session" tab is currently selected, indicating that the displayed information pertains to the user's application sessions.

The Assigned-apps section includes two filter buttons: "Apps With Sessions" to select applications with active sessions and "All Apps" to select all the applications. In the illustrated example, the "Apps With Sessions" option has been selected.

Further, the user graph is provided in graphical form. The UI 1202 provides other options for presenting the group user graph in tabular mode.

The user graph shows the interactions of the user with various applications. At the top of the graph, the name of the user is presented in a root node. The root node is connected to three other nodes, each node representing a different application or device.

In the illustrated example, the first node represents a GitHub connection and has a child node indicating the access device, which, in this example, is a Mac device. The second node represents access to Figma, and the node below shows access from an iPhone device with a mobile Safari application. The third node represents Google access from an unspecified type of device (labeled "Other").

An option is provided to the user where if the user selects an application in the graph, a pop-up window will ask the user if the session should be terminated. The user may also request information on application tokens granted (e.g., within a Google Workspace environment).

Figure 13:
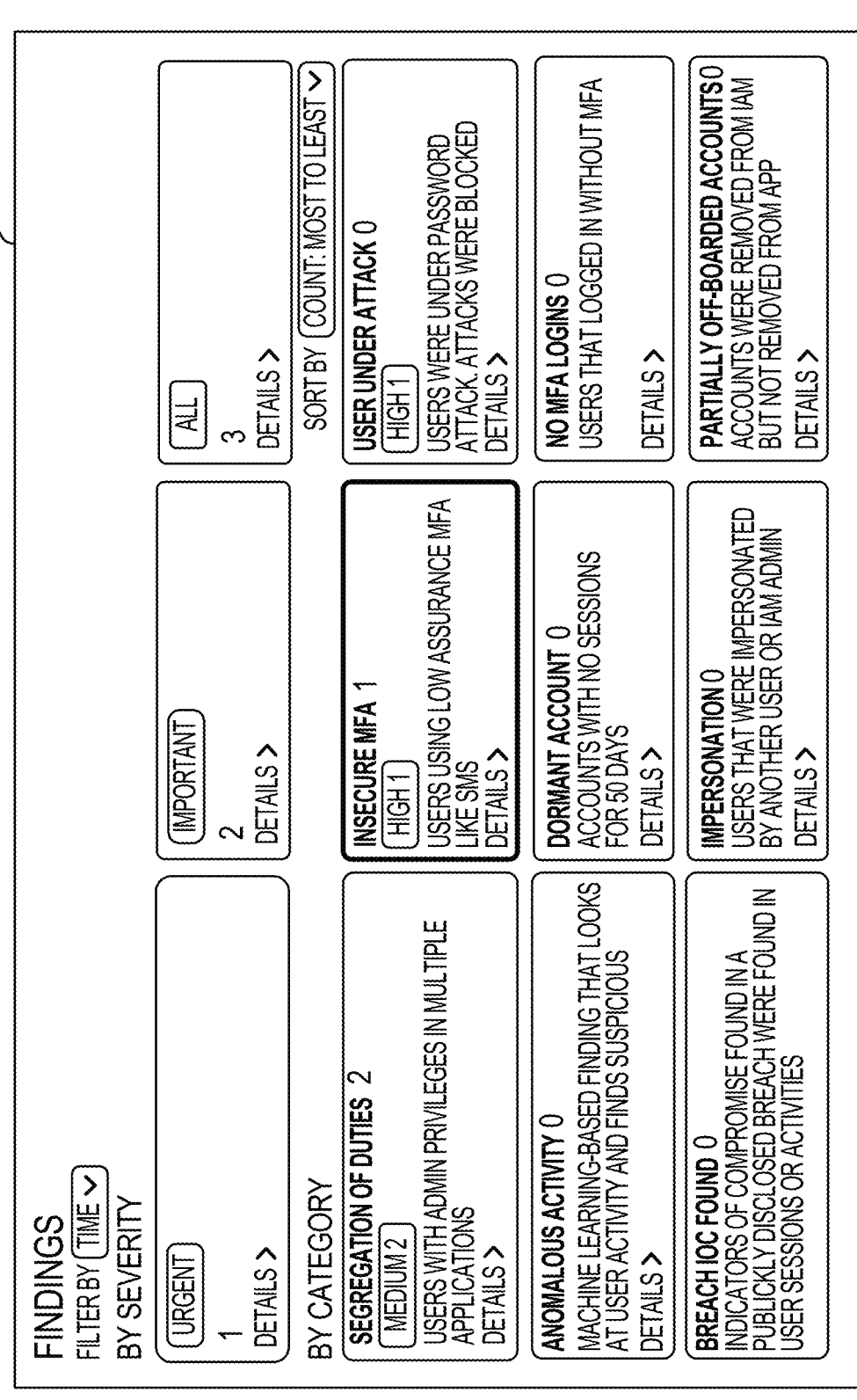
FIG. 13 is a UI showing findings related to security events, according to some examples.

FIG. 13 is a UI 1302 showing findings related to security events, according to some examples. At the top of the UI 1302, there is a "Filter By" dropdown menu, allowing users to filter the findings based on different criteria (e.g., time).

Below the filter option, the findings are categorized by severity and by category. The "By Severity" section includes three distinct severity levels: "Urgent" with a count of 1, "Important" with a count of 2, and "All" with a count of 3. Each severity level includes a "Details" link to request more detailed more information.

The "By Category" section lists various categories of security events, each with a count and a severity level indicator. In the illustrated example, the categories include: "Segregation of Duties" with a count of 2 and a "Medium" severity level; "Insecure MFA" with a count of 1 and a "High" severity level; "User under attack" with a count of 0; "Anomalous activity" with a count of 0; "Dormant Account" with a count of 0; "No MFA logins" with a count of 0; "Breach IoC found" with a count of 0; "Impersonation" with a count of 0; and "Partially off-boarded accounts" with a count of 0. Each category includes a brief description of the security event and a "Details" link for more information.

On the right side of the interface, there is a "Sort By" dropdown menu, allowing users to sort the findings based on different criteria, such as "Count (most to least)."

Findings are generated from the analysis of production data. It is possible to determine whether a specific application is in use and to identify any anomalous sessions associated with that application. In this instance, no anomalous sessions were detected.

Behavioral detection mechanisms are employed to assess whether any unusual activity has occurred, indicating potential unauthorized access by an attacker. Additionally, the system monitors for the use of insecure multi-factor authentication (MFA). This monitoring can apply to both legitimate users and potential attackers.

In one example (not shown), an MFA reset was performed, and a different MFA factor was added. The SSS continuously generates findings, which are visually represented in a graphical format to illustrate the data trends and anomalies detected.

FIG. 14 is a UI 1402 showing details on the findings, according to some examples. Findings represent the stage where data is synthesized. This process involves running the information through a detection and response engine to ascertain the current situation. A comprehensive risk assessment report is generated for the enterprise, detailing the level of risk present. A higher numerical value indicates a greater risk of potential compromise. The assessment encompasses various dimensions, including session activity, access governance, account lifecycle management, identification of risky activities, and the posture of multi-factor authentication (MFA). A detailed report is provided based on these evaluations.

The UI 1402 is divided into several sections. At the top of the interface, there are two tabs for selecting Finding Details, which is currently active, and Summary.

A details frame displays, with a high-priority alert, that anomalous behavior has been detected for a user. The details frame provides a summary of the user's activity during the session, including the applications accessed, represented by icons of various apps. A table is provided below to provide the reason or reasons for the finding and the details.

In the illustrated example, the reasons include the number of countries in the session and second column provides a list of countries in the session (e.g., United States, Canada, and Nepal); the number of browser versions in the session with a list of browser versions used during the session (e.g., Firefox 105.0, Edge 123.0.0, and other); and share of untrusted Ips with a list of IP addresses identified as fraudulent or suspicious (e.g., 167.25.150.168, 67.186.52.40).

A panel for the evidence section is presented on the right side of the UI 1402. This panel provides a timeline of the anomalous user session, including a start and an end of the anomalous user session.

Figure 15:
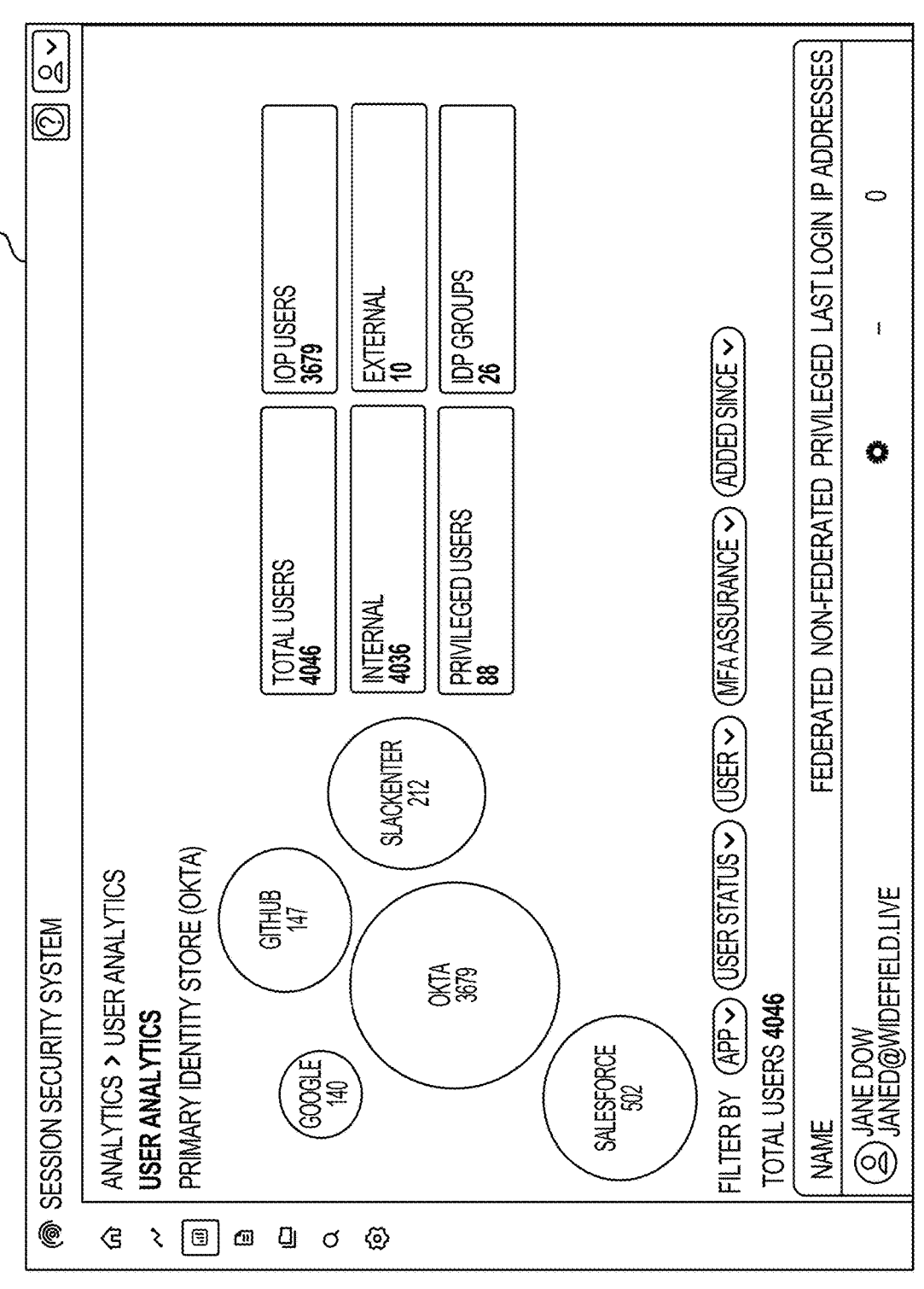
FIG. 15 is a UI showing user analytics, according to some examples.

FIG. 15 is a UI 1502 showing user analytics, according to some examples. Active sessions can be displayed to provide an overview of user engagement across various applications. A significant number of active users may be logged into multiple applications simultaneously. Detailed analysis can be conducted by examining individual sessions.

Data visualization tools can illustrate user activity, including the number of applications utilized by users, the distribution of sessions, and the identification of findings. Findings refer to detections or alerts generated during user interactions. This information is particularly beneficial for enterprise environments. While smaller organizations may have limited user bases, larger customer environments often lack access to such data. The session graph serves as a unique resource for obtaining this information.

The UI 1502 user interface shown in FIG. 15 is an example of a graphical representation of user analytics for a primary identity store, specifically Okta, according to some examples.

The UI 1502 shows the investigation path is for "Analytics>User Analytics," indicating the current location within the application. The title of the interface is "User Analytics," and a subheading below indicates it is for "Primary Identity Store (Okta)," which specifies the data source for the analytics being displayed.

A bubble chart on the left side visualizes the distribution of users across different applications. The bubbles are labeled with application names such as "Google," "GitHub," "Okta," "Salesforce," and "Slack," along with the corresponding user counts.

To the right of the bubble chart, several frames display user statistics: "Total users" displays the total number of users (e.g., 4046), "IDP users" shows the number of identity provider (IDP) users (e.g., 3679), "Internal" displays the number of internal users (e.g., 4036), "External" displays the number of external users (e.g., 10), "Privileged users" displays the number of privileged users (e.g., 88), and "IDP groups" displays the number of IDP groups (e.g., 26).

A filter bar below the statistics panels allows users to filter the displayed data based on various criteria. In some examples, the filter options include app, user status, user, MFA assurance, and added since. Below the filter bar, the total number of users is displayed again, which is 4046.

At the bottom of the interface, a user table lists individual user details. The table columns include: name displays the user's name; federated indicates whether the user is federated; non-federated indicates whether the user is non-federated; privileged indicates whether the user has privileged access; last login displays the last login time of the user; and IP addresses displays the IP addresses associated with the user.

Figure 16:
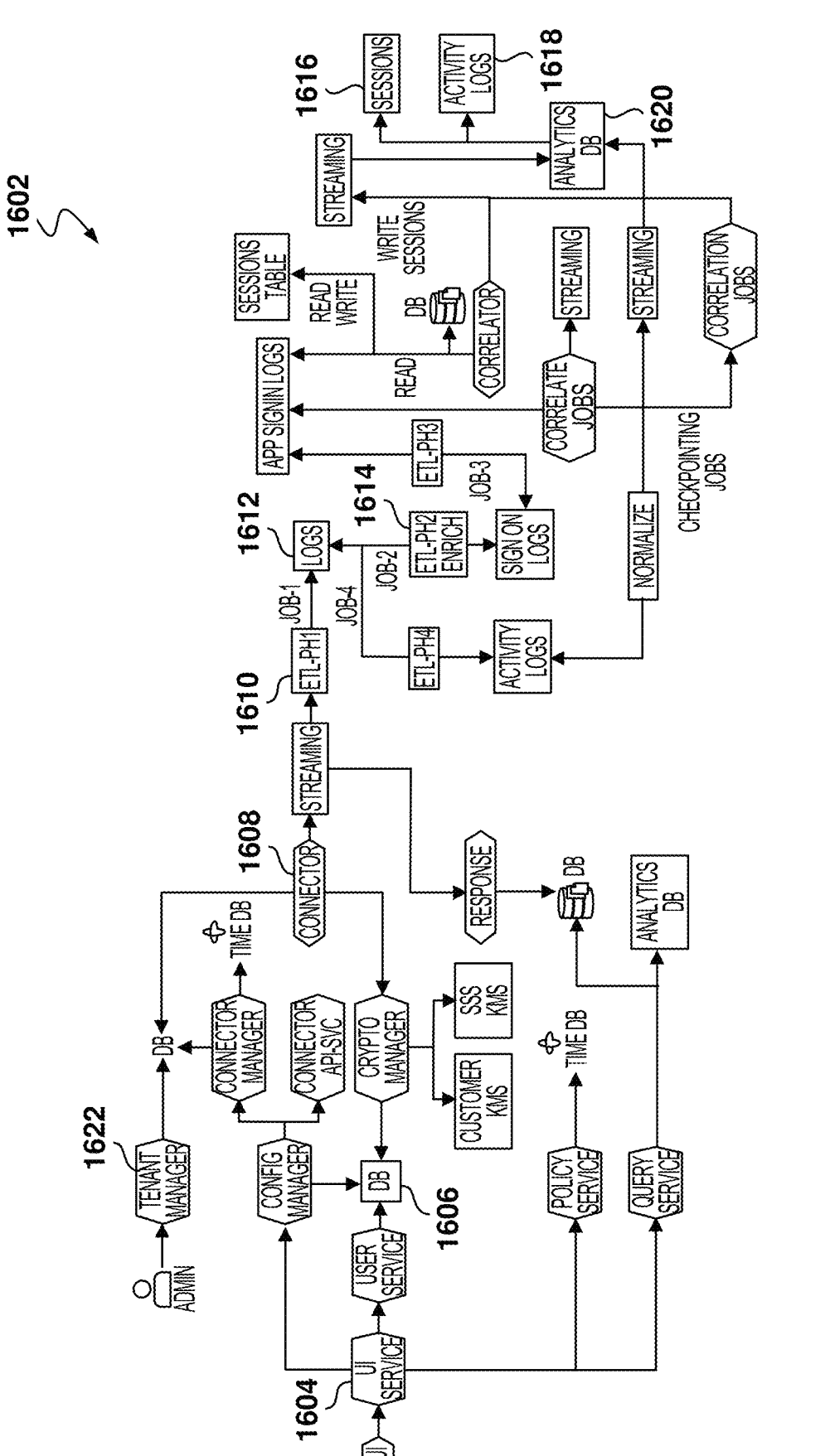
FIG. 16 is a high-level architecture for processing data by the SSS, according to some examples.

FIG. 16 is a high-level architecture 1602 for processing data by the SSS, according to some examples. A significant aspect of creating a graph involves the processing of large datasets.

An administrator interacts with a Tenant Manager 1622, which interfaces with the Configuration Manager. The Configuration Manager connects to the UI Service and User Service, which provide user interfaces and manage user interactions, respectively. The User Service is linked to the Customer KMS and SSS KMS for key management services.

When a customer accesses a UI 1640 and adds an application, the SSS retrieves the user data. Configuration information is stored in a database 1606, and a connector 1608 retrieves the necessary data.

The Policy Service and Query Service are also connected to the User Service, providing policy enforcement and query handling functionalities. Data from these services is stored in the Time DB and the Analytics DB.

The retrieved data undergoes an Extract, Transform, Load (ETL) process, which consists of multiple phases. In the initial phase, data is pulled and standardized into a specific format. The ETL phases include ETL-PH1, ETL-PH2 BRNCH, ETL-PH3, and ETL-PH4. Each ETL phase processes data and generates logs, such as Activity Logs and Sign-in Logs. The Normalization component processes the logs and streams the normalized data to the Correlator.

The data encompasses two primary categories: entities and activity logs 1612 related to users and third-party applications. Entities include users, groups, credentials, devices, multi-factor authentication factors, and applicable policies for the enterprise. These components are classified as configuration items.

The activity logs 1612 undergo a standardization process followed by enrichment 1614, which involves adding missing data to the logs. This process includes session correlation, where an activity log indicating a file download from SharePoint is linked to a specific user session. For instance, if a log entry indicates that a user downloaded a file, the system identifies the corresponding session that began seven days prior.

The Correlator performs correlation jobs and streams the correlated data to the Analytics DB. The Analytics DB stores the processed data and supports further streaming to the Sessions Table, which maintains session information.

A login graph is created at the time of user login, enabling the reconstruction of user activity by analyzing various data points such as IP addresses, devices, and user agents. This telemetry data from multiple sources allows for accurate identification of user activity, including the specific device and browser used during the session.

The output of the ETL process includes session logs 1616 and activity logs 1618, which are stored in a data repository. The session data is stored in an analytics database 1620. In some examples, the analytics database 1620 is Pinot, a high-performance analytics database.

The log processing workflow follows a typical Extract, Transform, Load (ETL) process, which includes data cleaning, transformation, and correlation with user identities. This enriched data is then organized into sessions, linking back to the initial login session. The curated data, stored in analytics database 1620, serves as the foundation for downstream processes, including machine learning, detection, and findings analysis.

FIG. 17 is a flowchart of a method 1700 for creating the session graph, according to some examples. While the various operations in this flowchart are presented and described sequentially, one of ordinary skill will appreciate that some or all of the operations may be executed in a different order, be combined or omitted, or be executed in parallel.

Operation 1702 is for receiving telemetry data from a plurality of entities.

From operation 1702, the method 1700 flows to operation 1704 for generating a live session graph based on the telemetry data. The live session graph comprises nodes and edges. The nodes represent a user identity, applications that the user identity accesses, and endpoints that the user identity uses to access the applications, and the edges between the nodes represent active sessions that the user identity is engaged in with the applications through the endpoints.

From operation 1704, the method 1700 flows to operation 1706 for analyzing the live session graph to determine a posture of a first user with respect to applications accessed and open sessions associated with the first user.

From operation 1706, the method 1700 flows to operation 1708 for identifying a security event based on the analysis of the live session graph.

From operation 1708, the method 1700 flows to operation 1710 for enforcing a remediation policy for the identified security event.

In some examples, the edges and the nodes identify which of the active sessions are with which of the applications through which of the endpoints.

Further, the method 1700 includes identifying which of the endpoints are managed. Also, the method 1700 further includes identifying which of the applications are sanctioned.

In some examples, the live session graph is configured to comprise additional nodes and edges that identify downstream applications (e.g., third-party applications) that use the active sessions with the applications to access the user identity and data associated with the user identity The method 1700 further includes identifying which of the downstream applications are risky.

The method 1700 further includes presenting the live session graph across a user interface.

The method 1700 further includes constructing the nodes and the edges using a session posture logic that stitches together a meta session with an underlying trail fragmented across multiple distributed sessions.

In some examples, the plurality of entities includes the applications.

In some examples, the plurality of entities includes one or more endpoints used by the user identity to engage with the applications.

In some examples, the plurality of entities includes one or more identity and access management (IAM) services (e.g., Okta™, Microsoft Azure AD™, Pingidentity™).

In some examples, the plurality of entities includes one or more endpoint detection and response (EDR) services (e.g., CrowdStrike™, SentinalOne™, Microsoft Defender™).

In some examples, the plurality of entities includes one or more enterprise mobility management (EMM) services (e.g., ManageEngine™, SOTPM, Citrix™)

In some examples, the plurality of entities includes one or more mobile device management (MDM) services (e.g., Hexnode™, Jamf™, JumpCloud™).

In some examples, the plurality of entities includes one or more unified endpoint management (UEM) services (e.g., Acronis™, Micro Focus™, Ivanti™)

In some examples, the plurality of entities includes one or more secure access service edge (SASE) services (e.g., Netskope™, Zscaler™, Palo Alto Networks™)

In some examples, the plurality of entities includes one or more cloud access security broker (CASB) services (e.g., Skyhigh™, Forcepoint™, Proofpoint™)

In some examples, the plurality of entities includes one or more secure web gateway (SWG) services (e.g., Cloudflare™, SonicWall™, Akamai™).

In some examples, the plurality of entities includes one or more third-party feed services (e.g., SpyCloud™, ActivTrak™, LastPass™).

In some examples, the telemetry signals include a set of curated telemetry signals.

In some examples, the telemetry signals specify risky third-party applications, wherein the risky third-party applications are identified based on evaluating various third-party applications on different application stores, and classifying those third-party applications as the risky third-party applications that lack enterprise-grade compliance, that do not provide data residency, that use unnecessarily broad scopes and permissions, that have unsafe sub-processors, or that use customer data to train their artificial intelligence (AI) models.

In some examples, the telemetry signals include audit logs generated by the plurality of entities during the sessions underlying the particular meta session.

In some examples, the audit logs specify events detected during the sessions underlying the particular meta session (e.g., detection events like malware detection, new user device added, noteworthy state changes like user deleted and user disabled; the EDR services reporting malware detection, the IAM services reporting user risk change, the SASE services reporting anomalous events, the SAAS services reporting anomalies).

In some examples, the audit logs specify activities detected during the sessions underlying the particular meta session (e.g., actions a user, an administrator, or a privileged user performs on the applications).

In some examples, the audit logs specify one or more changes in an endpoint security posture of one or more of the endpoints.

In some examples, the audit logs specify one or more changes in a user behavior posture of one or more users represented by the user identities.

In some examples, the telemetry signals span a plurality of telemetry signal categories.

Additionally, features regarding timestamp, user, groups, roles, apps, IP, device, activity, and session include the following features:

The telemetry signal categories include timestamp, user, groups, roles, application, internet protocol (IP), device, activity, and session.

The timestamp telemetry signal category includes "time of day" telemetry signals and "day of week" telemetry signals.

The user telemetry signal category includes "user e-mail" telemetry signals, "user WideField identifier (ID)" telemetry signals, and "is privileged" telemetry signals.

The application telemetry signal category includes "app name" telemetry signals, "app identifier (ID)" telemetry signals, and "app instance identifier (ID)" telemetry signals.

The IP telemetry signal category includes "location" telemetry signals, "autonomous system number (ASN)" telemetry signals, and "reputation" telemetry signals.

The device telemetry signal category includes operating system (OS) name" telemetry signals, "OS version" telemetry signals, "browser name" telemetry signals, "browser version" telemetry signals, "raw unified architecture (UA)" telemetry signals, "native app" telemetry signals, and "native app version" telemetry signals.

The activity telemetry signal category includes "login" telemetry signals, "logout" telemetry signals, "third-party app" telemetry signals, "grant" telemetry signals, "revoke" telemetry signals, "user read" telemetry signals, "user write" telemetry signals, "admin read" telemetry signals, "admin write" telemetry signals, settings change" telemetry signals, "status: success" telemetry signals, and "failure" telemetry signals.

The session telemetry signal category includes "IAM: session start time" telemetry signals, "SaaS: session start time" telemetry signals, "list of IP addresses seen so far" telemetry signals, "IAM: session start IP" telemetry signals, "SaaS. session start IP" telemetry signals, and "WideField session ID" telemetry signals.

With regards to correlation, the method 1700 may include the following features:

The correlated signal hierarchy aggregates into a composite view of those telemetry signals that were received at different times.

The aggregated composite view integrates device posture with day-to-day user activity logged in application sessions.

The aggregated composite view correlates user risk with internal and external telemetry signals indicating credential or identity compromise, wherein the internal telemetry signals include telemetry signals generated by the applications (e.g., user logging into the applications, user activity/interaction inside the applications with, e.g., contents like documents and files stored on the applications), and wherein the external telemetry signals include telemetry signals generated by the services (e.g., IAM login events, EDR malware detection events, SASE data loss protection (DLP) alerts).

With reference to federated versus non-federated sessions, the method 1700 may include the following features:

The particular application uses one of the IAM services for federated single sign-on (SSO), wherein the aggregated composite view specifies that an IAM SSO event precedes an application log-in event in the signal hierarchy, and, therefore, in the session hierarchy, an IAM session associated with the IAM SSO event precedes an application session associated with the application log in event, and therefore the particular meta session is inferred to be a federated session.

The aggregated composite view specifies that an application login event is not preceded by any IAM SSO event in the signal hierarchy, and therefore, in the session hierarchy, an application session associated with the application login event is not preceded by any IAM session and therefore the particular meta session is inferred to be a non-federated session.

With reference to cruising third-party applications (another example of curated telemetry signals), the method 1700 may include the following features:

The set of curated telemetry signals specifies cruising third-party applications that unsafely reuse meta sessions of the applications, wherein the aggregated composite view specifies whether the cruising third-party applications are unsafely reusing the meta sessions in browsers, in native applications, in application open authorization (OAuth), via application programming interface (API) tokens, via webhook tokens, or via secure shell protocol (SSH) keys, and wherein the aggregated composite view specifies whether the cruising third-party applications have any vulnerabilities that allow access to the API tokens, webhook tokens, or the SSH keys.

The method 1700 includes revoking access to the applications that grant downstream access to the cruising third-party applications.

With reference to direct users, the method 1700 may include the following features:

Directing the user represented by the user identity to terminate sessions with the cruising third-party applications.

Directing the user represented by the user identity to revoke downstream access to the cruising third-party applications.

Directing the user represented by the user identity to substitute the cruising third-party applications with safer alternative third-party applications, at least until the cruising third-party applications eliminate their vulnerabilities.

With reference to inferring missing fidelity using parent-child dependencies, the method 1700 may include the following features:

Constructing a high-fidelity profile of the particular meta session by incorporating otherwise missing session context in the high-fidelity session profile.

Using the aggregated composite view to determine the otherwise missing session context.

With reference to browser extensions to fill data gaps and holes, the method 1700 may include, wherein the otherwise missing session context is supplied by browser extensions running on the endpoints.

With reference to parent-child signal attribution, the signal hierarchy has child telemetry signals that inherit signal dependencies from parent telemetry signals in the signal hierarchy, wherein attributes of the parent telemetry signals are propagated to the child telemetry signals.

With reference to inferring user agent from an IAM session, the particular application uses one of the IAM services for federated SSO, wherein the aggregated composite view specifies that an IAM SSO event precedes an application login event in the signal hierarchy, and therefore, in the session hierarchy, a child application session associated with the application login event inherits from a parent IAM session associated with the IAM SSO event, wherein application user activity data in the child application session lacks "UserAgent" information, and wherein the IAM SSO event identifies the "UserAgent" information, and therefore the "UserAgent" information from the parent IAM session is attributed to the child application session.

Additional examples of correlation include the following:

The telemetry signals include IAM login activity and application login activity, wherein the correlated signal hierarchy of the IAM login activity and the application login activity reveals when an associated meta session was started, whether an associated meta session is privileged, whether an associated meta session is a federated session or a non-federated session, whether an associated meta session is sourced from a managed device, whether an associated meta session is sourced from a bad IP address, whether an associated meta session is sourced from a bad user agent, and whether an associated meta session is for a dormant user.

The telemetry signals include EDR events and application user/administrator (admin) activity, wherein the correlated signal hierarchy of the EDR events and the application user/admin activity reveals whether a user activity pattern became anomalous after a detection event was triggered by one of the EDR services, whether an admin-level activity happened after a detection event was triggered by one of the EDR services, and whether a user activity pattern change after a new device detection event was triggered by one of the EDR services.

The telemetry signals include application user/admin activity, wherein the correlated signal hierarchy of the application user/admin activity over a period of time reveals whether a user behavior is anomalous, whether a user agent changed during an associated meta session, whether a user IP address is flipping with unexpected IP locations, and whether a user IP address is flipping with good IP addresses but impossible IP locations.

The telemetry signals include IAM events and application activity, wherein the correlated signal hierarchy of the IAM events and the application activity reveals that a meta session associated with a user identity is continuing or showing anomalous behavior despite an associated IAM user risk being changed to high, that a meta session associated with a user identity is still active and ongoing despite an associated IAM user identity being deleted or disabled, and that user activities indicate that a user identity has an active meta session with an associated application despite an associated IAM user identity being removed from having access to the associated application.

The telemetry signals include SASE events and application activity, wherein the correlated signal hierarchy of the SASE events and the application activity reveals that SASE user risk has changed and that user activities appear anomalous, and that SASE reported anomalous activity and blocked a user identity, but associated user activity indicates that an associated meta session is still active and ongoing.

The telemetry signals include IAM, EDR, and application signals, where the correlated signal hierarchy includes IP address correlation.

With reference to telemetry signals having different formats and contents, the telemetry signals have different formats and contents depending on the entity that sourced the telemetry signals.

With reference to session postures: compromised, potentially compromised, healthy, the method 1700 may include the following features:

The determined posture is a compromised status of the particular meta session.

The determined posture is a potentially compromised status of the particular meta session (e.g., caused by anomalous access to the particular application).

The determined posture is a healthy status of the particular meta session.

With reference to policy-based actions, the session posture logic is further configured to enforce the policy by terminating the particular meta session.

With reference to server-side session termination across endpoints and devices, the session posture logic is further configured to terminate the particular meta session on the server-side at the applications, thereby terminating different sessions of the user identity at different endpoints or different applications.

With reference to ACH URL for non-API access, the following features are included:

The session posture logic is further configured to terminate the particular meta session for those applications that do not provide API access by inferring the particular meta session based on assertion consumer service (ACS) unified resource locator (URL).

The session posture logic is further configured to enforce the policy by requiring continuous verification from the user represented by the user identity.

The continuous verification spans multiple applications in the plurality of applications.

The continuous verification includes requiring the user to re-provide login credentials and revalidate identity (e.g., via biometrics).

The session posture logic is further configured to enforce the policy by removing access of the user represented by the user identity.

The session posture logic is further configured to enforce the policy by revoking the privileges of the user represented by the user identity.

The session posture logic is further configured to enforce the policy by generating an alert that communicates the determined posture of the particular meta session.

The session posture logic is further configured to enforce the policy by generating a notification that communicates the determined posture of the particular meta session to a security information and event management (SIEM) service.

The session posture logic is further configured to enforce the policy by generating a notification that communicates the determined posture of the particular meta session to a security operations center (SOC) (e.g., an admin, a management plane).

The session posture logic is further configured to enforce the policy by generating a request seeking confirmation from a user represented by the user identity about the legitimacy of one or more access patterns that caused the determination of the posture of the particular meta session.

With reference to the live session graph, the session posture logic is further configured to use the aggregated composite view to build the live session graph.

With reference to revoking access, revoking privileges, quarantining, and terminating active sessions, the session posture logic is further configured to use the aggregated composite view to revoke accesses, revoke privileges, quarantine user identity, quarantine sessions, and terminate active sessions.

With reference to valid IAM configuration and deployment, the following features are presented:

The session posture logic is further configured to use the aggregated composite view to determine whether the IAM services are validly configured.

The session posture logic is further configured to use the aggregated composite view to determine whether the IAM services are deployed correctly.

The session posture logic is further configured to use the aggregated composite view to determine whether privileged users (e.g., admins) of the IAM services can impersonate privileged users (e.g., admins) of the applications.

With reference to detecting parallel user sessions, the method may include the following:

The session posture logic is further configured to use the aggregated composite view to detect parallel user sessions.

The session posture logic is further configured to use the aggregated composite view to determine whether a particular session, identified by user, device, II), app, role, browser or native app, or version is being used from two different places simultaneously where the places would be determined by not just IP address but also a combination of user, device, role, and user agent.

With reference to Detecting anomalous user sessions (e.g., via expert and general ML and DL models), the features include:

The session posture logic is further configured to use the aggregated composite view to determine anomalous user sessions.

The session posture logic is further configured to use the aggregated composite view to determine the anomalous user sessions using one or more machine learning models (e.g., state vector machines (SVMs) or deep learning models (e.g., large language models (LLMs)).

The machine learning models or deep learning models include general models.

The machine learning models or deep learning models are segmented by per user, per user and device, per user, device, and app, and per tenant.

With reference to detecting privilege abuse/insider threat, the session posture logic is further configured to use the aggregated composite view to detect privilege abuse/insider threat and, in response, require justification/approval for doing a privileged action and keeping a record of the decision.

With reference to continuous verification, the following features are presented:

The session posture logic is further configured to use the aggregated composite view to require continuous verification across multiple applications.

The session posture logic is further configured to use the aggregated composite view to apply policy-based constructs on the telemetry signals received from the applications, the services, or the endpoints.

The session posture logic is further configured to use the aggregated composite view to execute automated remediation across distributed enforcement points.

With reference to Perform Segregation of Duties, the session posture logic is further configured to use the aggregated composite view to perform segregation of duties. Also, the session posture logic is further configured to use the aggregated composite view to ensure that admins do not have overlapping privileges.

With reference to implementing third-party app hygiene, the following features are presented:

The session posture logic is further configured to use the aggregated composite view to detect a toxic combination of admin with overlapping or multiple privileges and having poor user/device risk/hygiene.

The session posture logic is further configured to use the aggregated composite view to detect risky third-party app grants, wherein the riskiness is based on scopes granted, developer reputation, compliance certifications, and security policies.

The session posture logic is further configured to use the aggregated composite view to detect parallel third-party party app sessions using the same access token.

The session posture logic is further configured to use the aggregated composite view to detect anomalous third-party party app sessions using the same access token.

The session posture logic is further configured to use the aggregated composite view to detect anomalous third-party party apps in-line and, in response, educating the user represented by the user identity about risk and asking the user for justification to proceed or blocking the grant.

With reference to API access, the session posture logic is further configured to use application programming interfaces (APIs) to continuously receive the flows of telemetry signals from the plurality of entities.

With reference to polling, the session posture logic is further configured to use periodic polling to continuously receive the flows of telemetry signals from the plurality of entities.

With reference to web hooks, the session posture logic is further configured to use web hooks to continuously receive the flows of telemetry signals from the plurality of entities.

With reference to login and post-login telemetry signals, at least some of the telemetry signals are generated by the plurality of entities at login. Also, at least some of the telemetry signals are generated by the plurality of entities post-login.

With reference to cloud and on-premise apps, the applications are cloud applications or on-premise applications.

With reference to the out-of-band system, the following features are presented:

The out-of-band system does not intercept traffic between the endpoints and the applications.

The session posture logic is further configured to be independently located in the session environment.

The session posture logic is further configured to be co-located with one or more of the endpoints.

The session posture logic is further configured to be co-located with one or more of the applications.

The session posture logic is further configured to be co-located with one or more of the entities.

Another general aspect is for a system that includes a memory comprising instructions and one or more computer processors. The instructions, when executed by the one or more computer processors, cause the one or more computer processors to perform operations comprising: receiving telemetry data from a plurality of entities; generating a live session graph based on the telemetry data, the live session graph comprising nodes and edges, wherein the nodes represent a user identity, applications that the user identity accesses, and endpoints that the user identity uses to access the applications, wherein the edges between the nodes represent active sessions that the user identity is engaged in with the applications through the endpoints; analyzing the live session graph to determine a posture of a first user with respect to applications accessed and open sessions associated with the first user; identifying a security event based on the analysis of the live session graph; and enforcing a remediation policy for the identified security event.

In yet another general aspect, a tangible machine-readable storage medium (e.g., a non-transitory storage medium) includes instructions that, when executed by a machine, cause the machine to perform operations comprising: receiving telemetry data from a plurality of entities; generating a live session graph based on the telemetry data, the live session graph comprising nodes and edges, wherein the nodes represent a user identity, applications that the user identity accesses, and endpoints that the user identity uses to access the applications, wherein the edges between the nodes represent active sessions that the user identity is engaged in with the applications through the endpoints; analyzing the live session graph to determine a posture of a first user with respect to applications accessed and open sessions associated with the first user; identifying a security event based on the analysis of the live session graph; and enforcing a remediation policy for the identified security event.

FIG. 18 is a flowchart of a method 1800 for stitching a meta session, according to some examples. While the various operations in this flowchart are presented and described sequentially, one of ordinary skill will appreciate that some or all of the operations may be executed in a different order, be combined or omitted, or be executed in parallel.

The method 1800 is for managing and analyzing telemetry signals from various entities within a session environment, ultimately enforcing a security policy based on the determined posture of the meta session.

Stitching in the context of a meta session refers to the process of connecting and integrating underlying trails of interactions and telemetry signals fragmented across multiple distributed sessions and entities. This allows for a unified view and analysis of a user's engagement with various applications.

Operation 1802 is for receiving telemetry signals from a plurality of entities in a session environment, wherein the session environment includes at least one identity of a user engaged with respective applications via respective meta sessions.

From operation 1802, the method 1800 flows to operation 1804 for determining an underlying trail for each meta session, the underlying trail being fragmented across two or more sessions with two or more entities in the plurality of entities.

After operation 1804, operations 1806, 1808, 1810, and 1812 are performed for a first meta session with a first application associated with the identity of the user. Operation 1806 is for correlating a signal hierarchy based on the telemetry signals.

From operation 1806, the method 1800 flows to operation 1808 for constructing, based on the correlated signal hierarchy, a session hierarchy underlying the first meta session distributed across the one or more entities in the plurality of entities.

From operation 1808, the method 1800 flows to operation 1810 for determining a posture of the first meta session based on the constructed session hierarchy.

From operation 1810, the method 1800 flows to operation 1812 for enforcing a security policy based on the determined posture.

In some examples, the following features are provided:

The plurality of entities includes the applications.

The plurality of entities includes one or more endpoints used by the user identity to engage with the applications.

The plurality of entities includes one or more identity and access management (IAM) services (e.g., Okta™, Microsoft Azure AD™, ngIdentity™).

The plurality of entities includes one or more endpoint detection and response (EDR) services (e.g., Crowd-Strike™, SentinalOne™, Microsoft Defender™).

The plurality of entities includes one or more enterprise mobility management (EMM) services (e.g., ManageEngine™, SO TI™, Citrix™).

The plurality of entities includes one or more mobile device management (VIDM) services (e.g., Hexnode™, Jamf™, JumpCloud™).

The plurality of entities includes one or more unified endpoint management (UEM) services (e.g., Acronis™, Micro Focus™, Ivanti™).

The plurality of entities includes one or more secure access service edge (SASE) services (e.g., Netskope™, Zscaler™, Palo Alto Networks™).

The plurality of entities includes one or more cloud access security broker (CASB) services (e.g., Skyhigh™, Force-point™, Proofpoint™).

The plurality of entities includes one or more secure web gateway (SWG) services (e.g., Cloudflare™, SonicWall™, Akamai™).

The plurality of entities includes one or more third-party feed services (e.g., SpyCloud™, ActivTrak™, LastPass™).

With reference to curated signals, the telemetry signals include a set of curated telemetry signals.

With reference to risky third-party apps, the set of curated telemetry signals specifies risky third-party applications, where the risky third-party applications are identified based on evaluating various third-party applications on different application stores, and classifying those third-party applications as the risky third-party applications that lack enterprise-grade compliance, that do not provide data residency, that use unnecessarily broad scopes and permissions, that have unsafe sub-processors, or that use customer data to train their artificial intelligence (AI) models.

With reference to telemetry signals, the telemetry signals include audit logs generated by the plurality of entities during the sessions underlying the first meta session.

With reference to events, activities, changes in endpoint, and user behavior posture, the following features are provided:

The audit logs specify events detected during the sessions underlying the first meta session (e.g., detection events like malware detection, new user device added, noteworthy state changes like user deleted and user disabled; the EDR services reporting malware detection, the IAM services reporting user risk change, the SASE services reporting anomalous events, the SAAS services reporting anomalies).

The audit logs specify activities detected during the sessions underlying the first meta session (e.g., actions a user, an administrator, or a privileged user performs on the applications).

The audit logs specify one or more changes in an endpoint security posture of one or more of the endpoints.

The audit logs specify one or more changes in a user behavior posture of one or more users represented by the user identities.

With reference to telemetry signal categories, the telemetry signals span a plurality of telemetry signal categories.

With reference to timestamp, user, groups, roles, apps, IP, device, activity, and session, the following features are provided:

The telemetry signal categories include timestamp, user, groups, roles, application, internet protocol (IP), device, activity, and session.

The timestamp telemetry signal category includes "time of day" telemetry signals and "day of week" telemetry signals.

The user telemetry signal category includes "user e-mail" telemetry signals, "user WideField identifier (ID)" telemetry signals, and "is privileged" telemetry signals.

The application telemetry signal category includes "app name" telemetry signals, "app identifier (ID)" telemetry signals, and "app instance identifier (ID)" telemetry signals.

The IP telemetry signal category includes "location" telemetry signals, "autonomous system number (ASN)" telemetry signals, and reputation" telemetry signals.

The device telemetry signal category includes "operating system (OS) name" telemetry signals, "OS version" telemetry signals, "browser name" telemetry signals, "browser version" telemetry signals, "raw unified architecture (UA)" telemetry signals, "native app" telemetry signals, and "native app version" telemetry signals.

The activity telemetry signal category includes "login" telemetry signals, "logout" telemetry signals, "third-party app" telemetry signals, "grant" telemetry signals, "revoke" telemetry signals, "user_read" telemetry signals, user_ write" telemetry signals, "admin read" telemetry signals, "admin_write" telemetry signals, "settings_change" telemetry signals, "status: success" telemetry signals, and "failure" telemetry signals.

The session telemetry signal category includes "IAM: session start time" telemetry signals, "SaaS: session start time" telemetry signals, "list of IP addresses seen so far" telemetry signals, "IAM: session start IP" telemetry signals, SaaS: session start IP" telemetry signals, and "WideField session ID" telemetry signals.

With reference to Correlation, the following features are provided:

The correlated signal hierarchy aggregates into a composite view of those telemetry signals that were received at different times.

The aggregated composite view integrates device posture with day-to-day user activity logged in application sessions.

The aggregated composite view correlates user risk with internal and external telemetry signals indicating credential or identity compromise, wherein the internal telemetry signals include telemetry signals generated by the applications (e.g., user logging into the applications, user activity/interaction inside the applications with, e.g., contents like documents and files stored on the applications), and wherein the external telemetry signals include telemetry signals generated by the services (e.g., IAM login events, EDR malware detection events, SASE data loss protection (DLP) alerts).

With reference to federated versus non-federated sessions, the following features are provided:

The application uses one of the IAM services for federated single sign-on (SSO), wherein the aggregated composite view specifies that an IAM SSO event precedes an application log-in event in the signal hierarchy, and therefore, in the session hierarchy, an IAM session associated with the IAM SSO event precedes an application session associated with the application login event, and therefore the particular meta session is inferred to be a federated session.

The aggregated composite view specifies that an application login event is not preceded by any IAM SSO event in the signal hierarchy, and therefore, in the session hierarchy, an application session associated with the application login event is not preceded by any IAM session and therefore the particular meta session is inferred to be a non-federated session.

With reference to cruising third-party applications (another example of curated telemetry signals), the following features are provided:

The set of curated telemetry signals specifies cruising third-party applications that unsafely reuse meta sessions of the applications, wherein the aggregated composite view specifies whether the cruising third-party applications are unsafely reusing the meta sessions in browsers, in native applications, in application open authorization (OAuth), via application programming interface (API) tokens, via webhook tokens, or via secure shell protocol (SSH) keys, and wherein the aggregated composite view specifies whether the cruising third-party applications have any vulnerabilities that allow access to the API tokens, webhook tokens, or the SSH keys.

Revoke access to the applications that grant downstream access to the cruising third-party applications.

With reference to direct users, the following features are provided:

Direct the user represented by the user identity to terminate sessions with the cruising third-party applications.

Direct the user represented by the user identity to revoke downstream access to the cruising third-party applications.

Direct the user represented by the user identity to substitute the cruising third-party applications with safer alternative third-party applications, at least until the cruising third-party applications eliminate their vulnerabilities.

With reference to inferring missing fidelity using parent-child dependencies, the following features are provided:

The session posture logic is further configured to construct a high-fidelity profile of the particular meta session by incorporating otherwise missing session context in the high-fidelity session profile.

The session posture logic is further configured to use the aggregated composite view to determine the otherwise missing session context.

With reference to browser extensions to fill data gaps and holes, the otherwise missing session context is supplied by browser extensions running on the endpoints.

With reference to parent-child signal attribution, the signal hierarchy has child telemetry signals that inherit signal dependencies from parent telemetry signals in the signal hierarchy, wherein attributes of the parent telemetry signals are propagated to the child telemetry signals.

With reference to inferring UserAgent from the IAM session, the particular application uses one of the IAM services for federated SSO, wherein the aggregated composite view specifies that an IAM SSO event precedes an application log-in event in the signal hierarchy, and therefore, in the session hierarchy, a child application session associated with the application log in event inherits from a parent IAM session associated with the IAM SSO event, wherein application user activity data in the child application session lacks "UserAgent" information, and wherein the IAM SSO event identifies the "UserAgent" information, and therefore the "UserAgent" information from the parent IAM session is attributed to the child application session.

With reference to additional examples of correlation, the following features are provided:

The telemetry signals include IAM login activity and application login activity, wherein the correlated signal hierarchy of the IAM login activity and the application login activity reveals when an associated meta session was started, whether an associated meta session is privileged, whether an associated meta session is a federated session or a non-federated session, whether an associated meta session is sourced from a managed device, whether an associated meta session is sourced from a bad IP address, whether an associated meta session is sourced from a bad user agent, and whether an associated meta session is for a dormant user.

The telemetry signals include EDR events and application user/administrator (admin) activity, wherein the correlated signal hierarchy of the EDR events and the application user/admin activity reveals whether a user activity pattern became anomalous after a detection event was triggered by one of the EDR services, whether an admin-level activity happened after a detection event was triggered by one of the EDR services, and whether a user activity pattern change after a new device detection event was triggered by one of the EDR services.

The telemetry signals include application user/admin activity, wherein the correlated signal hierarchy of the application user/admin activity over a period of time reveals whether a user behavior is anomalous, whether a user agent changed during an associated meta session, whether a user IP address is flipping with unexpected IP locations, and whether a user IP address is flipping with good IP addresses but impossible IP locations.

The telemetry signals include IAM events and application activity, wherein the correlated signal hierarchy of the IAM events and the application activity reveals that a meta session associated with a user identity is continuing or showing anomalous behavior despite an associated IAM user risk being changed to high, that a meta session associated with a user identity is still active and ongoing despite an associated IAM user identity being deleted or disabled, and that user activities indicate that a user identity has an active meta session with an associated application despite an associated IAM user identity being removed from having access to the associated application.

The telemetry signals include SASE events and application activity, wherein the correlated signal hierarchy of the SASE events and the application activity reveals that SASE user risk has changed and, that user activities appear anomalous, and that SASE reported anomalous activity and blocked a user identity, but associated user activity indicates that an associated meta session is still active and ongoing.

The telemetry signals include IAM, EDR, and application signals, wherein the correlated signal hierarchy includes IP address correlation.

With reference to telemetry signals having different formats and contents, the telemetry signals have different formats and contents depending on the entity that sourced the telemetry signals.

With reference to Session postures: compromised, potentially compromised, healthy, the following features are provided:

The determined posture is a compromised status of the particular meta session.

The determined posture is a potentially compromised status of the particular meta session (e.g., caused by anomalous access to the particular application).

The determined posture is a healthy status of the particular meta session.

With reference to policy-based actions, the session posture logic is further configured to enforce the policy by terminating the particular meta session.

With reference to server-side session termination across endpoints and devices, the session posture logic is further configured to terminate the particular meta session on the server-side at the applications, thereby terminating different sessions of the user identity at different endpoints or different applications.

With reference to the ACS URL for non-API Access, the following features are provided:

The session posture logic is further configured to terminate the particular meta session for those applications that do not provide API access by inferring the particular meta session based on Assertion Consumer Service (ACS) unified resource locator (URL).

The session posture logic is further configured to enforce the policy by requiring continuous verification from the user represented by the user identity.

The continuous verification spans multiple applications in the plurality of applications.

The continuous verification includes requiring the user to re-provide login credentials and revalidate identity (e.g., via biometrics).

The session posture logic is further configured to enforce the policy by removing access of the user represented by the user identity The session posture logic is further configured to enforce the policy by revoking the privileges of the user represented by the user identity.

The session posture logic is further configured to enforce the policy by generating an alert that communicates the determined posture of the particular meta session.

The session posture logic is further configured to enforce the policy by generating a notification that communicates the determined posture of the particular meta session to a security information and event management (SIEM) service.

The session posture logic is further configured to enforce the policy by generating a notification that communicates the determined posture of the particular meta session to a security operations center (SOC) (e.g., an admin, a management plane).

The session posture logic is further configured to enforce the policy by generating a request seeking confirmation from a user represented by the user identity about the legitimacy of one or more access patterns that caused the determination of the posture of the particular meta session.

With reference to the live session graph, the session posture logic is further configured to use the aggregated composite view to build a live session graph.

With reference to revoking access, revoking privileges, quarantining, and terminating active sessions, the session posture logic is further configured to use the aggregated composite view to revoke accesses, revoke privileges, quarantine user identity, quarantine sessions, and terminate active sessions.

With reference to valid IAM configuration and deployment, the following features are provided:

The session posture logic is further configured to use the aggregated composite view to determine whether the IAM services are validly configured.

The session posture logic is further configured to use the aggregated composite view to determine whether the IAM services are deployed correctly.

The session posture logic is further configured to use the aggregated composite view to determine whether privileged users (e.g., admins) of the IAM services can impersonate privileged users (e.g., admins) of the applications.

With reference to detecting parallel user sessions, the following features are provided:

The session posture logic is further configured to use the aggregated composite view to detect parallel user sessions.

The session posture logic is further configured to use the aggregated composite view to determine whether a particular session, identified by user, device, IP, app, role, browser or native app, or version is being used from two different places simultaneously, wherein the places would be determined by not just IP address but also combination of user, device, role, and user agent.

With reference to detecting anomalous user sessions (e.g., via specific and general ML and DL models), the following features are provided:

The session posture logic is further configured to use the aggregated composite view to determine anomalous user sessions.

The session posture logic is further configured to use the aggregated composite view to determine the anomalous user sessions using one or more machine learning models (e.g., state vector machines (SVMs) or deep learning models (e.g., large language models (LLMs)).

The machine learning models or deep learning models include general models.

The machine learning models or deep learning models are segmented by per user, per user and device, per user, device, and app, and per tenant.

With reference to detecting privilege abuse/insider threat, the session posture logic is further configured to use the aggregated composite view to detect privilege abuse/insider threat and, in response, require justification/approval for doing a privileged action and keeping a record of the decision.

With reference to continuous verification, the following features are provided:

The session posture logic is further configured to use the aggregated composite view to require continuous verification across multiple applications.

The session posture logic is further configured to use the aggregated composite view to apply policy-based constructs on the telemetry signals received from the applications, the services, or the endpoints.

The session posture logic is further configured to use the aggregated composite view to execute automated remediation across distributed enforcement points.

With reference to performing segregation of duties, the following features are provided:

The session posture logic is further configured to use the aggregated composite view to perform segregation of duties.

The session posture logic is further configured to use the aggregated composite view to ensure that admins do not have overlapping privileges.

With reference to implementing third-party app hygiene, the following features are provided:

The session posture logic is further configured to use the aggregated composite view to ensure the detection of a toxic combination of admin with overlapping or multiple privileges and poor user/device risk/hygiene.

The session posture logic is further configured to use the aggregated composite view to detect risky third-party app grants, wherein the riskiness is based on scopes granted, developer reputation, compliance certifications, and security policies.

The session posture logic is further configured to use the aggregated composite view to detect parallel third-party party app sessions using the same access token.

The session posture logic is further configured to use the aggregated composite view to detect anomalous third-party party app sessions using the same access token.

The session posture logic is further configured to use the aggregated composite view to detect anomalous third-party party apps inline and, in response, educating the user represented by the user identity about risk and asking the user for justification to proceed or blocking the grant.

With reference to API Access, the session posture logic is further configured to use application programming interfaces (APIs) to continuously receive the flows of telemetry signals from the plurality of entities.

With reference to polling, the session posture logic is further configured to use periodic polling to continuously receive the flows of telemetry signals from the plurality of entities.

With reference to web hooks, the session posture logic is further configured to use web hooks to continuously receive the flows of telemetry signals from the plurality of entities.

With reference to login and post-login telemetry signals, the following features are provided:

At least some of the telemetry signals are generated by the plurality of entities at login.

At least some of the telemetry signals are generated by the plurality of entities post-login.

With reference to the out-of-band system, the following features are provided:

An out-of-band system that does not intercept traffic between the endpoints and the applications.

The session posture logic is further configured to be independently located in the session environment.

The session posture logic is further configured to be co-located with one or more of the endpoints.

The session posture logic is further configured to be co-located with one or more of the applications.

The session posture logic is further configured to be co-located with one or more of the entities.

FIG. 19 is a flowchart of a method 1900 for detecting a compromised-identity event, according to some examples. While the various operations in this flowchart are presented and described sequentially, one of ordinary skill will appreciate that some or all of the operations may be executed in a different order, be combined or omitted, or be executed in parallel.

Operation 1902 is for receiving telemetry signals for one or more sessions associated with a user engaged with a plurality of applications through one or more endpoints. The telemetry signals can include various types of data, such as login times, IP addresses, device information, and user behavior patterns. This data is collected in real-time or near real-time to ensure up-to-date monitoring of user activities.

From operation 1902, the method 1900 flows to operation 1904 for determining an access pattern trail distributed across the one or more sessions of the user. For instance, it may involve tracking the sequence of applications accessed, the duration of each session, and the frequency of access. The goal is to establish a baseline of normal user behavior against which anomalies can be detected.

From operation 1904, the method 1900 flows to operation 1906 for aggregating a composite view of the access pattern trail by correlating the telemetry signals into a signal hierarchy.

From operation 1906, the method 1900 flows to operation 1908 for inferring a compromised identity event for the user based on the composite view of the access pattern trail and the signal hierarchy. For example, if an anomaly is detected—such as an unusual login time, access from an unfamiliar device, or a sudden change in user behavior—it may indicate a potential identity compromise. The system then flags this event for further investigation or immediate action.

In some examples, the fragments of telemetry signals are received from one or more applications in the plurality of applications.

In some examples, the multiple sessions include sessions with the one or more applications.

In some examples, the fragments of telemetry signals are received from one or more services in the plurality of services.

In some examples, the multiple sessions include sessions with the one or more services.

In some examples, the fragments of telemetry signals are received from one or more of the endpoints.

Figure 20:
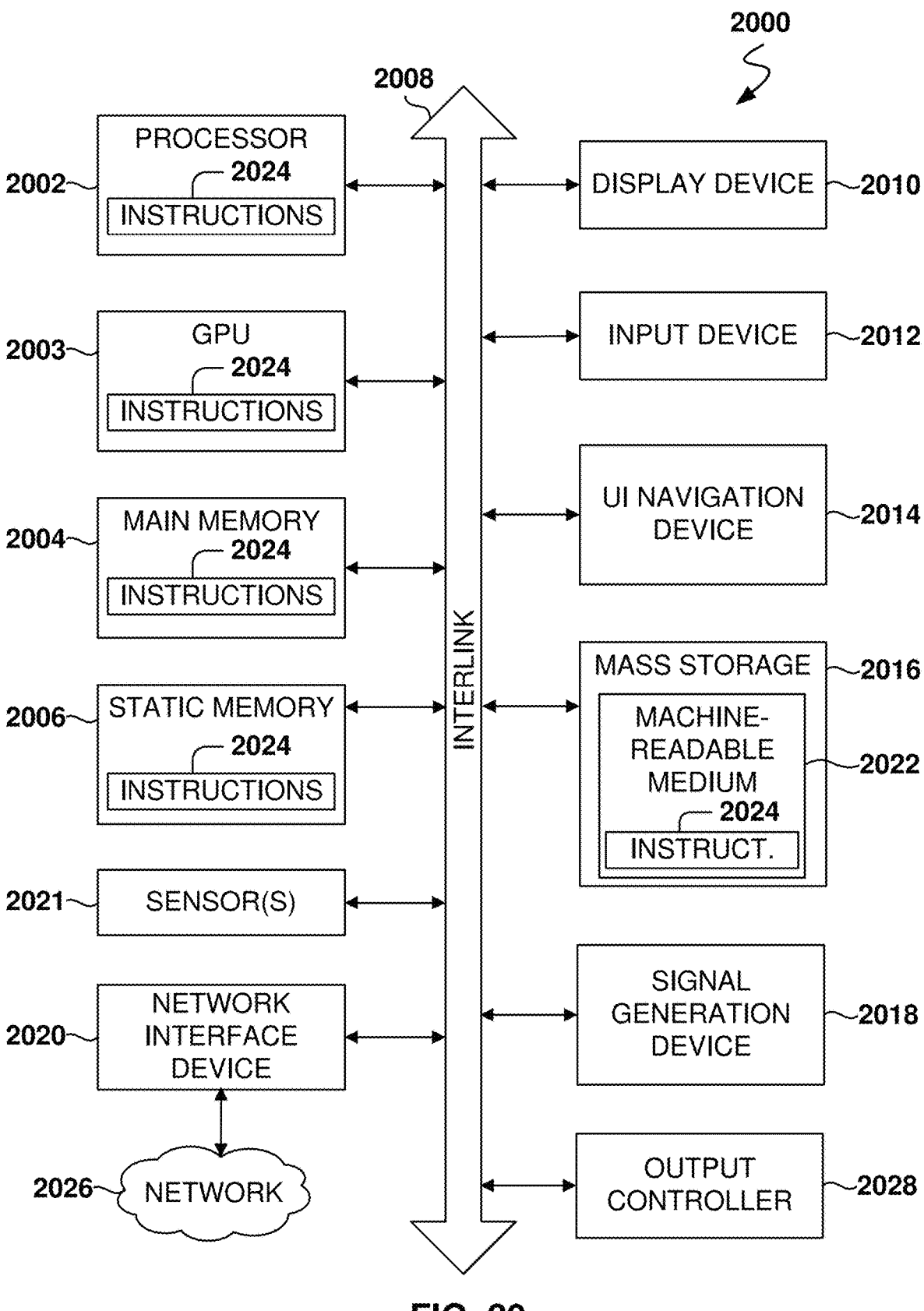
FIG. 20 is a block diagram illustrating an example of a machine upon or by which one or more example process examples described herein may be implemented or controlled.

FIG. 20 is a block diagram illustrating an example of a machine 2000 upon or by which one or more example process examples described herein may be implemented or controlled. In alternative examples, the machine 2000 may operate as a standalone device or be connected (e.g., networked) to other machines. In a networked deployment, the machine 2000 may operate in the capacity of a server machine, a client machine, or both in server-client network environments. In an example, the machine 2000 may act as a peer machine in a peer-to-peer (P2P) (or other distributed) network environment. Further, while only a single machine 2000 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 2000 (e.g., computer system) may include a hardware processor 2002 (e.g., a central processing unit (CPU), a hardware processor core, or any combination thereof), a graphics processing unit (GPU 2003), a main memory 2004, and a static memory 2006, some or all of which may communicate with each other via an interlink 2008 (e.g., bus). The machine 2000 may further include a display device 2010, an alphanumeric input device 2012 (e.g., a keyboard), and a user interface (UI) navigation device 2014 (e.g., a mouse). In an example, the display device 2010, alphanumeric input device 2012, and UI navigation device 2014 may be a touch screen display. The machine 2000 may additionally include a mass storage device 2016 (e.g., drive unit), a signal generation device 2018 (e.g., a speaker), a network interface device 2020, and one or more sensors 2021, such as a Global Positioning System (GPS) sensor, compass, accelerometer, or another sensor. The machine 2000 may include an output controller 2028, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 2002 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 2002 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 2002 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 2002 may be emulated in software, running on a physical processor, as a virtual processor or virtual circuit. The virtual processor may behave like an independent processor but is implemented in software rather than hardware.

The mass storage device 2016 may include a machine-readable medium 2022 on which one or more sets of data structures or instructions 2024 (e.g., software) embodying or utilized by any of the techniques or functions described herein. The instructions 2024 may also reside, completely or at least partially, within the main memory 2004, within the static memory 2006, within the hardware processor 2002, or the GPU 2003 during execution thereof by the machine 2000. For example, one or any combination of the hardware processor 2002, the GPU 2003, the main memory 2004, the static memory 2006, or the mass storage device 2016 may constitute machine-readable media.

While the machine-readable medium 2022 is illustrated as a single medium, the term "machine-readable medium" may include a single medium or multiple media (e.g., a centralized or distributed database and associated caches and servers) configured to store one or more instructions 2024.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The term "machine-readable medium" may include any medium that is capable of storing, encoding, or carrying instructions 2024 for execution by the machine 2000 and that causes the machine 2000 to perform any one or more of the techniques of the present disclosure or that is capable of storing, encoding, or carrying data structures used by or associated with such instructions 2024. Non-limiting machine-readable medium examples may include solid-state memories and optical and magnetic media. For example, a massed machine-readable medium comprises a machine-readable medium 2022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2024 may be transmitted or received over a communications network 2026 using a transmission medium via the network interface device 2020.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:
receiving telemetry data from a plurality of entities;
generating a live session graph based on the telemetry data, the live session graph comprising nodes and edges, wherein the nodes represent a user identity, applications that the user identity accesses, and endpoints that the user identity uses to access the applications, wherein the edges between the nodes represent active sessions that the user identity is engaged in with the applications through the endpoints;
analyzing the live session graph to determine a posture of a first user with respect to applications accessed and open sessions associated with the first user;
identifying a security event based on the analysis of the live session graph; and
enforcing a remediation policy for the identified security event.

2. The method as recited in claim 1, wherein the edges and the nodes identify which of the active sessions are with which of the applications through which of the endpoints.

3. The method as recited in claim 1, further comprising:
determining additional nodes and edges that identify downstream applications that use the active sessions with the applications to access the user identity and data associated with the user identity.

4. The method as recited in claim 1, wherein identifying the security event includes determining third-party applications that are risky, wherein the third-party applications that are risky are identified based on evaluating various third-party applications on different application stores, and the third-party applications are determined as risky based on one or more of lacking enterprise-grade compliance, not providing data residency, using unnecessarily broad scopes and permissions, having unsafe sub-processors, or using customer data to train artificial intelligence models.

5. The method as recited in claim 1, further comprising:
presenting on a display the live session graph in a user interface.

6. The method as recited in claim 1, wherein the telemetry data includes audit logs generated by the plurality of entities during the active sessions.

7. The method as recited in claim 1, wherein the plurality of entities includes one or more identity and access management (IAM) services.

8. The method as recited in claim 1, wherein the plurality of entities includes one or more endpoint detection and response (EDR) services.

9. The method as recited in claim 1, wherein the plurality of entities includes one or more enterprise mobility management (EMM) services.

10. The method as recited in claim 1, wherein the plurality of entities includes one or more secure access service edge (SASE) services.

11. The method as recited in claim 1, wherein the plurality of entities includes one or more signals generated from one or more endpoints.

12. The method as recited in claim 1, wherein the remediation policy is one of an automated policy or a manual policy, wherein the remediation police comprises one or more of revoking sessions, revoking user access to an application, revoking a third-party application grant, revoking privileges, changing federated account password for Identity and Access Management, or unassigning a federated application.

13. A system comprising:
a memory comprising instructions; and
one or more computer processors, the instructions, when executed by the one or more computer processors, causing the system to perform operations comprising:
receiving telemetry data from a plurality of entities;
generating a live session graph based on the telemetry data, the live session graph comprising nodes and edges, wherein the nodes represent a user identity, applications that the user identity accesses, and endpoints that the user identity uses to access the applications, wherein the edges between the nodes represent active sessions that the user identity is engaged in with the applications through the endpoints;

analyzing the live session graph to determine a posture of a first user with respect to applications accessed and open sessions associated with the first user;

identifying a security event based on the analysis of the live session graph; and enforcing a remediation policy for the identified security event.

14. The system as recited in claim 13, wherein the edges and the nodes identify which of the active sessions are with which of the applications through which of the endpoints.

15. The system as recited in claim 13, wherein the instructions further cause the one or more computer processors to perform operations comprising:

determining additional nodes and edges that identify downstream applications that use the active sessions with the applications to access the user identity and data associated with the user identity.

16. The system as recited in claim 13, wherein identifying the security event includes determining third-party applications that are risky, wherein the third-party applications that are risky are identified based on evaluating various third-party applications on different application stores, and the third-party applications are determined as risky based on one or more of lacking enterprise-grade compliance, not providing data residency, using unnecessarily broad scopes and permissions, having unsafe sub-processors, or using customer data to train artificial intelligence models.

17. The system as recited in claim 13, wherein the instructions further cause the one or more computer processors to perform operations comprising:

presenting on a display the live session graph in a user interface.

18. A non-transitory machine-readable storage medium including instructions that, when executed by a machine, cause the machine to perform operations comprising:

receiving telemetry data from a plurality of entities;

generating a live session graph based on the telemetry data, the live session graph comprising nodes and edges, wherein the nodes represent a user identity, applications that the user identity accesses, and endpoints that the user identity uses to access the applications, wherein the edges between the nodes represent active sessions that the user identity is engaged in with the applications through the endpoints;

analyzing the live session graph to determine a posture of a first user with respect to applications accessed and open sessions associated with the first user;

identifying a security event based on the analysis of the live session graph; and enforcing a remediation policy for the identified security event.

19. The non-transitory machine-readable storage medium as recited in claim 18, wherein the edges and the nodes identify which of the active sessions are with which of the applications through which of the endpoints.

20. The non-transitory machine-readable storage medium as recited in claim 18, wherein the machine further performs operations comprising:

determining additional nodes and edges that identify downstream applications that use the active sessions with the applications to access the user identity and data associated with the user identity.

* * * * *